US012564136B2

(12) United States Patent
Sato et al.

(10) Patent No.: US 12,564,136 B2
(45) Date of Patent: Mar. 3, 2026

(54) MOWER, MOWING SYSTEM, AND DRIVE CONTROL METHOD

(71) Applicant: TOYOTA JIDOSHA KABUSHIKI KAISHA, Toyota (JP)

(72) Inventors: Shinsuke Sato, Toyota (JP); Takehito Sakakibara, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 540 days.

(21) Appl. No.: 18/151,831

(22) Filed: Jan. 9, 2023

(65) Prior Publication Data

US 2023/0232745 A1    Jul. 27, 2023

(30) Foreign Application Priority Data

Jan. 26, 2022    (JP) ................................. 2022-010527

(51) Int. Cl.
| | |
|---|---|
| *A01D 75/28* | (2006.01) |
| *A01D 34/00* | (2006.01) |
| *A01D 34/76* | (2006.01) |
| *A01D 34/86* | (2006.01) |
| *A01D 69/02* | (2006.01) |

(Continued)

(52) U.S. Cl.
CPC ........... *A01D 75/28* (2013.01); *A01D 34/008* (2013.01); *A01D 34/76* (2013.01); *A01D 34/86* (2013.01); *A01D 69/02* (2013.01); *A01D 75/285* (2013.01); *A01D 34/664* (2013.01); *A01D 34/78* (2013.01); *A01D 2101/00* (2013.01)

(58) Field of Classification Search
CPC ...... A01D 75/28; A01D 75/285; A01D 34/86; A01D 34/664; A01D 34/78; A01D 34/76; A01D 34/008; A01D 2101/00; A01D 69/02
See application file for complete search history.

(56) References Cited

U.S. PATENT DOCUMENTS

| | | | | |
|---|---|---|---|---|
| 11,076,529 B2 * | 8/2021 | Chen | ...................... | G05D 1/028 |
| 11,192,533 B2 * | 12/2021 | Ota | ......................... | F16H 48/22 |

(Continued)

FOREIGN PATENT DOCUMENTS

| | | | |
|---|---|---|---|
| CN | 107074218 A | | 8/2017 |
| EP | 3381257 A1 * | | 10/2018 |

(Continued)

OTHER PUBLICATIONS

Application Note from Analog Devices on using triple axis accelerometers to compute gradient (Year: 2010).*

(Continued)

*Primary Examiner* — Fadey S. Jabr
*Assistant Examiner* — Ashutosh Pande
(74) *Attorney, Agent, or Firm* — Hunton Andrews Kurth LLP

(57) ABSTRACT

A mower includes: driving devices respectively provided on a right side and a left side of the mower and configured to be driven independently; and one or more processors configured to: estimate a gradient of a slope on a travel path; and drive the driving devices with different driving forces on the right side and the left side based on the estimated gradient such that the mower does not slip down the slope when the mower travels in a direction crossing the slope.

9 Claims, 15 Drawing Sheets

(51) Int. Cl.
| | |
|---|---|
| *A01D 34/66* | (2006.01) |
| *A01D 34/78* | (2006.01) |
| *A01D 101/00* | (2006.01) |

(56) References Cited

U.S. PATENT DOCUMENTS

| | | | | |
|---|---|---|---|---|
| 11,350,563 B2 * | 6/2022 | Kraft | .................... | A01D 34/008 |
| 2008/0264026 A1 | 10/2008 | Ishii et al. | | |
| 2009/0260901 A1 | 10/2009 | Ishii et al. | | |
| 2016/0263997 A1 | 9/2016 | Mizutani | | |
| 2019/0056748 A1 | 2/2019 | Budihal et al. | | |
| 2022/0232775 A1 * | 7/2022 | Kraus | ................... | A01D 34/006 |
| 2023/0232745 A1 * | 7/2023 | Sato | ........................ | A01D 34/86 |
| | | | | 56/321 |
| 2024/0152145 A1 * | 5/2024 | Koch | ................... | G06Q 10/063 |

FOREIGN PATENT DOCUMENTS

| | | | | |
|---|---|---|---|---|
| EP | 3998517 A1 * | 5/2022 | ............. | G01S 19/47 |
| GB | 2576265 A | 2/2020 | | |
| JP | H11127607 A | 5/1999 | | |
| JP | 2004166543 A | 6/2004 | | |
| JP | 2008263920 A | 11/2008 | | |
| JP | 2009255840 A | 11/2009 | | |
| JP | 2011004677 A | 1/2011 | | |
| JP | 2018042477 A | 3/2018 | | |
| JP | 2018174707 A | 11/2018 | | |
| KR | 20150010126 A | 1/2015 | | |
| KR | 20190007956 A | 1/2019 | | |
| WO | 2016066481 A1 | 5/2016 | | |
| WO | WO-2021073587 A1 * | 4/2021 | .......... | A01D 34/008 |

OTHER PUBLICATIONS

2019 IEEE Eurasia Conference on IPT, Communications and Engineering (Year: 2019).*

Translation of WO2021073587A1 (Year: 2025).*

Chinese Office Action issued in Application No. CN 202310078457.3 dated Apr. 18, 2025 (Partial English translation).

* cited by examiner

MOWER, MOWING SYSTEM, AND DRIVE CONTROL METHOD

CROSS-REFERENCE TO RELATED APPLICATION

This application claims priority to Japanese Patent Application No. 2022-010527 filed on Jan. 26, 2022, incorporated herein by reference in its entirety.

BACKGROUND

1. Technical Field

The present disclosure relates to a mower, a mowing system, and a drive control method.

2. Description of Related Art

Japanese Unexamined Patent Application Publication No. 2018-174707 (JP 2018-174707 A) discloses a mower that mows grass while traveling along an expected working slope automatically or by remote control.

SUMMARY

The mower that mows grass on a slope as described above may slip down the slope depending on the gradient of the slope and become unable to travel in the traveling direction, thereby deviating from a predetermined travel path.

In view of the above facts, the present disclosure provides a mower that can travel in a traveling direction without deviating from a predetermined travel path, a mowing system, and a drive control method for the mower.

A mower according to a first aspect of the present disclosure includes driving devices respectively provided on a right side and a left side of the mower and configured to be driven independently; and one or more processors configured to: estimate a gradient of a slope on a travel path; and drive the driving devices with different driving forces on the right side and the left side based on the estimated gradient such that the mower does not slip down the slope when the mower travels in a direction crossing the slope.

A mowing system according to a second aspect of the present disclosure includes an external device configured to estimate a gradient of a slope on a travel path, and output information on the estimated gradient, and a mower provided separately from the external device. The mower includes driving devices respectively provided on a right side and a left side of the mower and configured to be driven independently; and one or more processors configured to: receive the output information; and drive the driving devices with different driving forces on the right side and the left side based on the received information such that the mower does not slip down the slope when the mower travels in a direction crossing the slope.

In a drive control method for a mower according to a third aspect of the present disclosure, the mower includes driving devices respectively provided on a right side and a left side of the mower and configured to be driven independently. The drive control method includes estimating a gradient of a slope on a travel path based on acceleration information obtained by a triaxial acceleration sensor on the travel path or height information of the travel path that is based on point cloud data in a captured image acquired in advance for the travel path; and driving the driving devices with different driving forces on the right side and the left side based on the estimated gradient such that the mower does not slip down the slope when the mower travels in a direction crossing the slope.

As described above, the mower, the mowing system, and the drive control method for the mower according to the present disclosure attain an excellent effect that the mower can travel in the traveling direction without deviating from the predetermined travel path.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

First Embodiment

Figure 1:
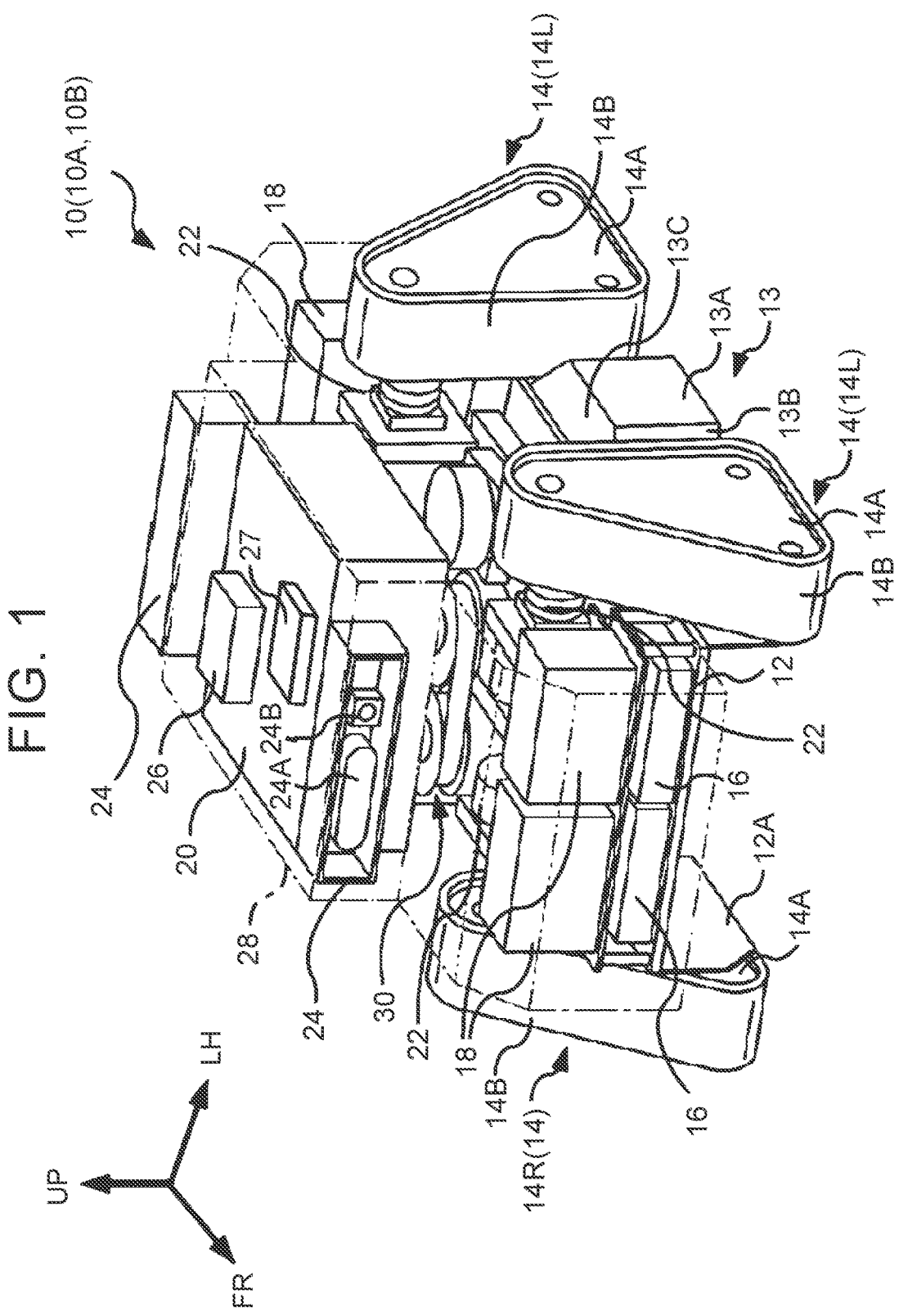
FIG. 1 is a perspective view schematically illustrating the structure of a mower according to a first embodiment of the present disclosure.

A mower 10 according to a first embodiment of the present disclosure will be described with reference to the drawings. In the drawings, an arrow UP indicates an upper side in a vertical direction of a vehicle, and an arrow FR indicates a front side in a fore-and-aft direction of the vehicle. An arrow LH indicates a left side in a width direction of the vehicle, and an arrow RH indicates a right side in the width direction of the vehicle. In the following description, the vertical direction and the fore-and-aft direction refer to "up" and "down" in the vertical direction of the vehicle and "front" and "rear" in the fore-and-aft direction of the vehicle, and a lateral direction refers to "right" and "left" in the width direction of the vehicle.

Structure of Mower 10

The mower 10 according to the first embodiment is a self-traveling mower, and for example, mows grass on a ridge of a rice field or a farm field. As shown in FIG. 1 as an example, the mower 10 includes a body 12, crawler units 14 serving as drive units (driving devices), motor controllers 16, battery devices 18, a control device 20, drive motors 22, camera units 24, a global positioning system or global positioning satellite (GPS) device 26, a sensor unit 27, an exterior cover 28, and a cutting blade unit 30.

Figure 2:
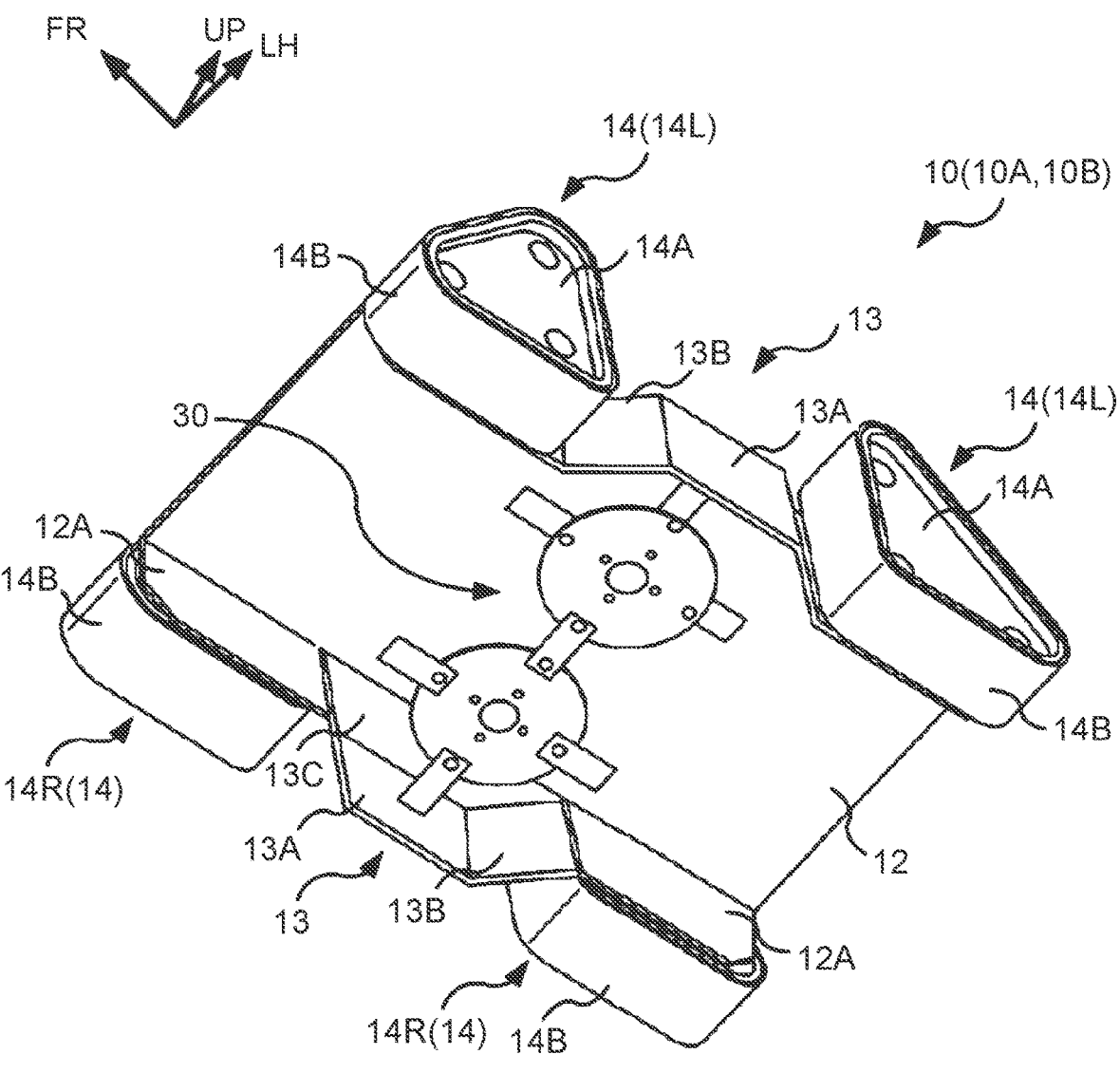
FIG. 2 is a bottom perspective view of the mower in FIG. 1.

As shown in FIGS. 1 and 2, the body 12 is made of a substantially rectangular plate material, and various devices are placed on its upper surface. The body 12 has under covers 12A that cover inner sides of four crawler units 14 described later in the width direction of the vehicle. The under covers 12A are made of plate materials and extend downward in a substantially rectangular shape from both ends of the body 12 in the width direction of the vehicle at positions corresponding to the four crawler units 14. In the present embodiment, the body 12 and the under covers 12A are integrated together as an example, but may be formed separately.

The body 12 has cutting blade covers 13 that cover cutting blades 36 of the cutting blade unit 30 described later between two under covers 12A provided on the right side and between two under covers 12A provided on the left side. Each cutting blade cover 13 is made of a plate material and both ends in the fore-and-aft direction of the vehicle are coupled to the under covers 12A of two crawler units 14. The body 12, the under covers 12A, and the cutting blade covers 13 are made of, for example, a metal material such as steel or aluminum or a fiber-reinforced plastic material.

The cutting blade cover 13 includes a central portion 13A, two slanted portions 13B, and an upper portion 13C. The central portion 13A has a rectangular shape and protrudes outward in the width direction of the vehicle relative to the under cover 12A. The two slanted portions 13B are provided at both ends of the central portion 13A in the fore-and-aft direction of the vehicle, and extend obliquely from both the ends of the central portion 13A in the fore-and-aft direction of the vehicle toward the under covers 12A. The upper portion 13C has a substantially trapezoidal shape and four sides thereof are coupled to the body 12, the central portion 13A, and the two slanted portions 13B. In the present embodiment, for example, the cutting blade cover 13, the body 12, and the under covers 12A are formed separately, but may be integrated together. The cutting blade cover 13 prevents foreign matter from entering the cutting blades 36 from lateral sides, that is, right and left sides of the mower 10, and also prevents mown grass from scattering to the lateral sides of the mower 10.

The crawler units 14 are provided in the fore-and-aft direction on both the right and left sides. The mower 10 of the present embodiment includes four crawler units 14. Each crawler unit 14 includes a rotator 14A and a crawler 14B. The rotator 14A is a substantially right-angled triangular pillar, and rotates about an axis extending in the width direction of the vehicle. The crawler 14B is a rubber member that covers the outer peripheral surface of the rotator 14A around its axis, and has a belt shape. The outer surface of the crawler 14B has asperities (not shown) to keep traveling performance even if the condition of the traveling surface is unstable. A shaft (not shown) of the rotator 14A is coupled to a motor shaft (not shown) of the drive motor 22 and is rotated by the drive motor 22. In the present embodiment, two front and rear crawler units 14 on the left side in the width direction of the vehicle may be referred to as "left crawler units 14L", and two front and rear crawler units 14 on the right side in the width direction of the vehicle may be referred to as "right crawler units 14R".

The motor controllers 16 control drive of the drive motors 22 and cutting blade motors 32 described later. The mower 10 of the present embodiment includes four drive motors 22 and two cutting blade motors 32 as described later. For example, the mower 10 of the present embodiment includes a total of six motor controllers 16A to 16F, that is, four motor controllers 16A to 16D that control the drive of the four drive motors 22, respectively, and two motor controllers 16E and 16F that control the drive of the two cutting blade motors 32, respectively.

Figure 4:
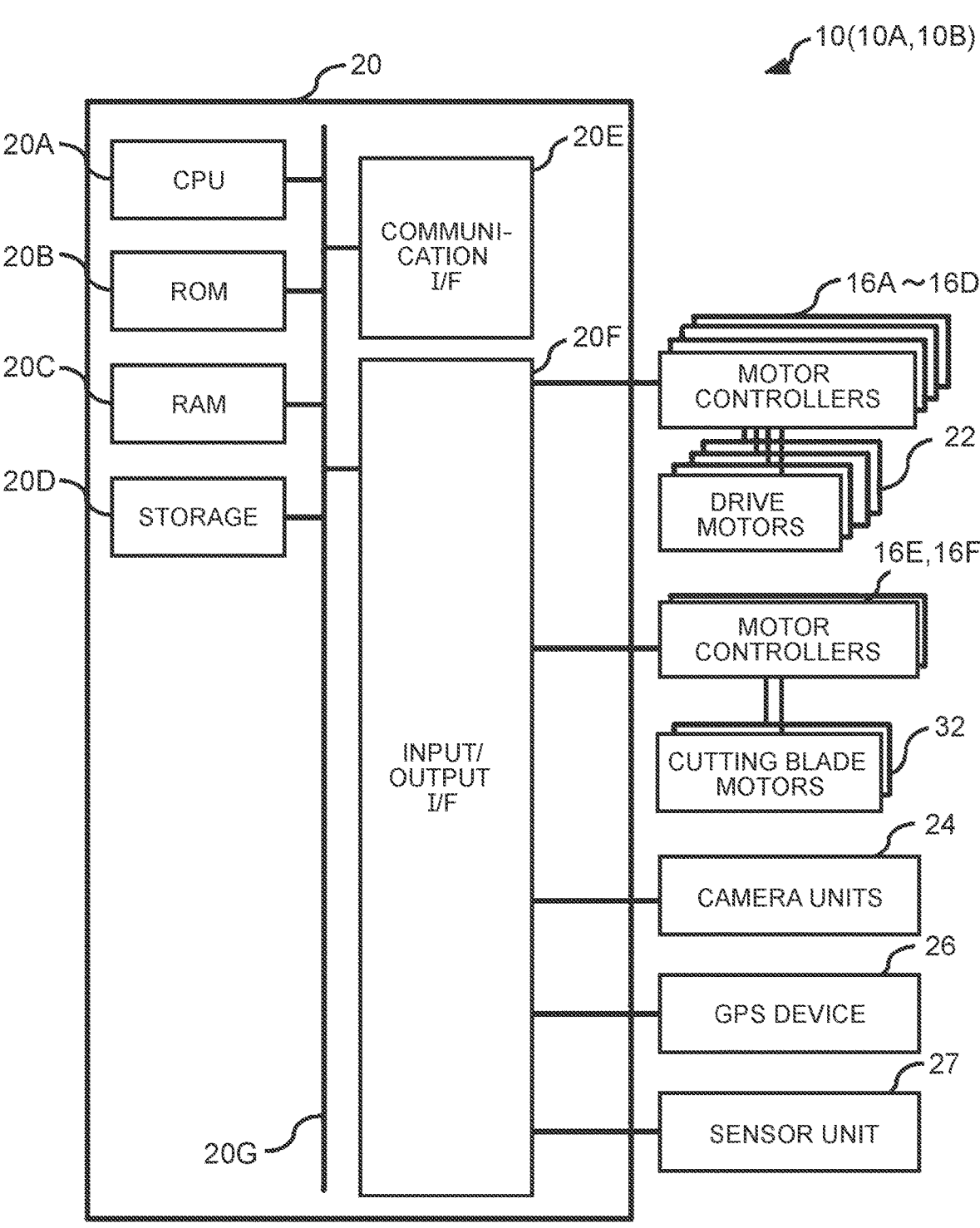
FIG. 4 is a block diagram showing the hardware configuration of the mower according to the first embodiment of the present disclosure.

The motor controllers 16A to 16D that control the drive of the drive motors 22 are electrically connected to the drive motors 22 and the control device 20 (see FIG. 4). The motor controllers 16A to 16D control the drive of the rotators 14A coupled to the drive motors 22, that is, the crawler units 14. The motor controllers 16E and 16F that control the drive of the cutting blade motors 32 are electrically connected to the cutting blade motors 32 and the control device 20 (see FIG. 4). The motor controllers 16E and 16F control the drive of the cutting blades 36 described later that are coupled to the cutting blade motors 32. A method for controlling the crawler units 14 by the motor controllers 16A to 16D will be described later in detail.

Each battery device 18 serves as a drive source for the drive motor 22, and is, for example, a rechargeable direct current (DC) power supply with a rated voltage of 18 V and a rated capacity of 6.0 Ah. The battery device 18 includes a secondary battery such as a lithium-ion secondary battery or a nickel-metal hydride battery, and a capacitor such as an electric double layer capacitor can also be employed. The mower 10 of the present embodiment includes, for example, four battery devices 18. The four battery devices 18 supply electric power to electronic devices mounted on the mower 10, such as the drive motors 22 and the cutting blade motors 32.

The control device 20 controls the drive of the mower 10 as a whole, and is arranged on an upper side inside the exterior cover 28. The control device 20 will be described later in detail.

The four drive motors 22 are provided in the mower 10 of the present embodiment, and are, for example, DC brushless motors. The four drive motors 22 are connected to the four crawler units 14 and driven by commands from the motor controllers 16A to 16D, respectively.

The camera units 24 are cameras capable of imaging the surroundings of the mower 10, and are provided on the front and rear sides on the upper outer surface of the exterior cover 28 in the mower 10 of the present embodiment. Each of the camera units 24 provided on the front and rear sides includes a three-dimensional (3D) camera 24A and a Raspberry Pi camera 24B.

The GPS device 26 includes an antenna (not shown) that receives a signal from an artificial satellite (GPS satellite) (not shown), and is capable of measuring a current position of the mower 10.

The sensor unit 27 includes a triaxial acceleration sensor, and outputs gravitational accelerations in the lateral direction (horizontal direction: x direction), the fore-and-aft direction (horizontal direction: y direction), and the vertical direction (perpendicular direction: z direction). In the present embodiment, the sensor unit 27 outputs these gravitational accelerations as acceleration information.

The exterior cover 28 is a box-shaped housing with an open bottom and covers the body 12 from above.

Figure 3:
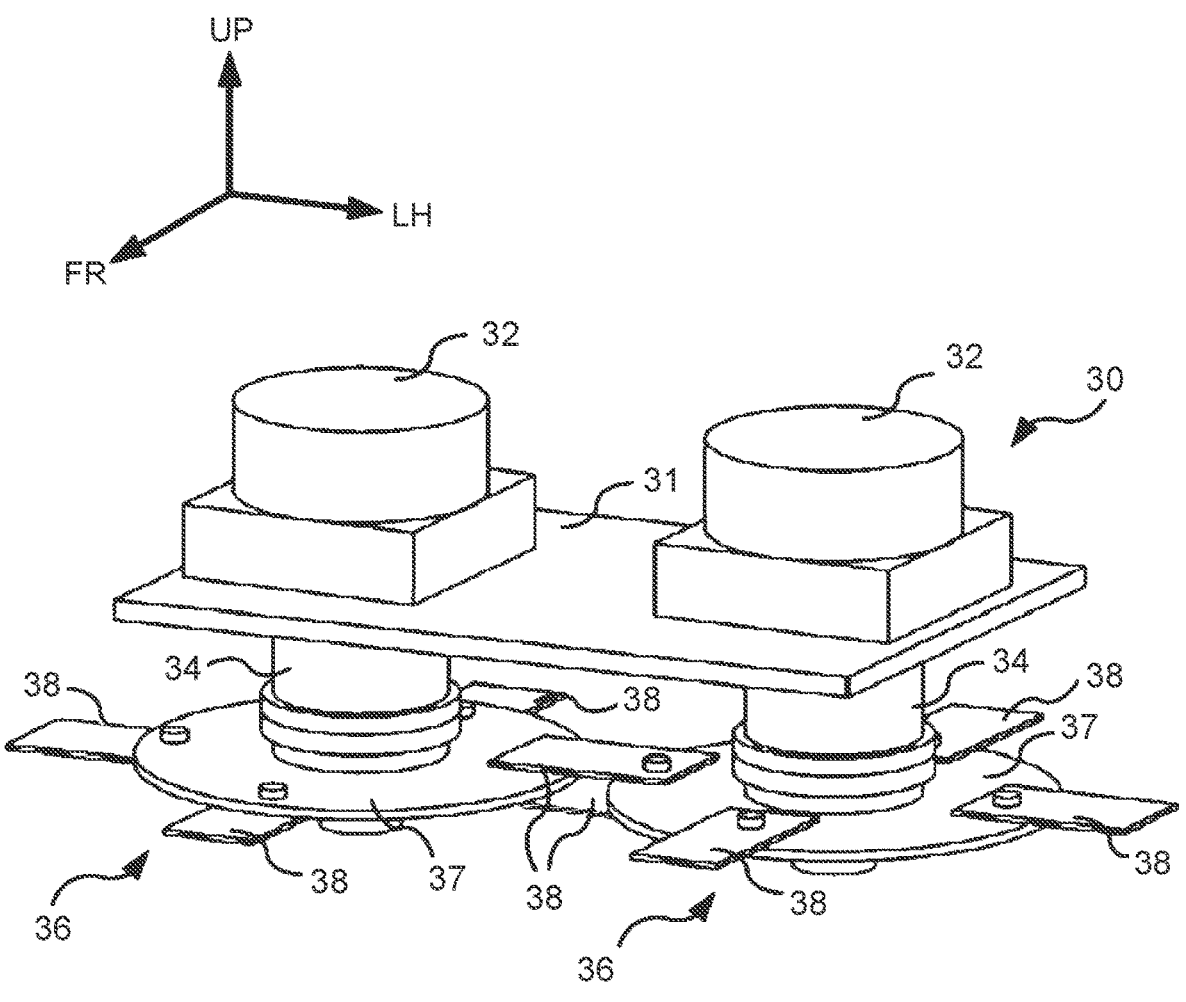
FIG. 3 is a perspective view schematically illustrating the structure of a cutting blade unit of the mower in FIG. 1.

The cutting blade unit 30 has a structure for mowing grass. Specifically, as shown in FIG. 3, the cutting blade unit 30 includes a rectangular plate-shaped base portion 31 arranged on the upper surface of the body 12. The base portion 31 has a height adjusting structure (not shown) capable of adjusting the height in the vertical direction relative to the body 12. This height adjusting structure can be, for example, manual or automatic, and can be a known structure.

The cutting blade motors 32 are mounted on the upper surface of the base portion 31 with a predetermined distance in the lateral direction. In the present embodiment, the cutting blade motor 32 is, for example, a DC brushless motor.

Each of the two cutting blade motors 32 includes a motor shaft 34 inserted through an insertion hole (not shown) of the base portion 31. The cutting blades 36 are rotatably fixed to the lower ends of the two motor shafts 34, respectively.

The cutting blade 36 includes a disc portion 37 rotatably fixed to the motor shaft 34, and four rectangular cutting edges 38 fixed to the disc portion 37 to protrude outward in four directions from the outer circumference of the disc portion 37. The right and left cutting blades 36 are arranged at slightly offset positions in the vertical direction (height direction) so that their cutting edges 38 do not interfere with each other. The cutting blades 36 are rotationally driven by the cutting blade motors 32 to mow grass.

In the present embodiment, the height of the base portion 31 is adjusted in the vertical direction by the height adjusting structure described above, thereby adjusting the height positions of the cutting blades 36. In the present embodiment, the height is adjusted, for example, to position the cutting edges 38 at a height of 50 mm from the ground. For example, the heights of the cutting edges 38 can be adjusted to a plurality of levels such as 80 mm and 100 mm in addition to the height of 50 mm from the ground. Thus, the mowing can be performed at any of these heights.

In the present embodiment, the control device 20 controls the travel of the mower 10 based on pieces of data acquired by the camera units 24, the GPS device 26, and the sensor unit 27 and a travel path stored in a storage 20D described later.

Hardware Configuration of Mower 10

Next, the control device 20 will be described in detail. As shown in FIG. 4, the control device 20 mounted on the mower 10 includes a central processing unit (CPU: processor) 20A that is an example of a processor, a read only memory (ROM) 20B, a random access memory (RAM) 20C, the storage 20D, a communication interface (communication I/F) 20E, and an input/output interface (input/output I/F) 20F. The components are communicably connected to each other via a bus 20G.

The CPU 20A is a central processing unit that executes various programs and controls various units. That is, the CPU 20A reads the program from the ROM 20B or the storage 20D and executes the program by using the RAM 20C as a work area. The CPU 20A controls each component and performs various arithmetic processes based on the program recorded in the ROM 20B or the storage 20D.

The ROM 20B stores various programs and various types of data. The RAM 20C temporarily stores a program or data as a work area. The storage 20D includes a hard disk drive (HDD) or a solid state drive (SSD), and stores various programs including an operating system and various types of data including map data. The storage 20D also stores a preset travel path. In the present embodiment, the ROM 20B or the storage 20D stores programs for performing various functions, various types of data, and the like.

The communication I/F 20E is an interface that allows the mower 10 to communicate with a server (not shown) and other devices, and standards such as Ethernet (registered trademark), Long-Term Evolution (LTE), Fiber Distributed Data Interface (FDDI), and Wi-Fi (registered trademark) are used.

The input/output I/F 20F is an interface that allows the control device 20 to communicate with various devices mounted on the mower 10. The control device 20 is communicably connected to each device described later via the input/output I/F 20F. These devices may directly be connected to the bus 20G.

Specifically, the input/output I/F 20F is connected to the motor controllers 16A to 16D, the motor controllers 16E and 16F, the camera units 24, the GPS device 26, the sensor unit 27, and the like.

The motor controllers 16A to 16D output control signals to the drive motors 22 based on command signals input from the control device 20 to control, for example, the numbers of rotations, rotation speeds, and rotation directions of the drive motors 22. In the present embodiment, the control device 20 and the motor controllers 16A to 16D can change the traveling direction of the mower 10 by independently controlling the numbers of rotations, the rotation speeds, and the rotation directions of the drive motors 22.

The motor controllers 16E and 16F output control signals to the cutting blade motors 32 based on command signals input from the control device 20 to control, for example, the numbers of revolutions, rotation speeds, and rotation directions of the cutting blade motors 32. In the present embodiment, the control device 20 and the motor controllers 16E and 16F can change the mowing condition of the mower 10 by independently controlling the numbers of revolutions, the rotation speeds, and the rotation directions of the cutting blade motors 32.

The camera units 24 are cameras that image the surroundings of the mower 10, and captured images of objects around the mower 10 are temporarily stored in the storage 20D.

The GPS device 26 temporarily stores measured positional information of the mower 10 in the storage 20D, and updates the positional information of the mower 10 at predetermined time intervals.

The sensor unit 27 is a device for detecting an inclination of the mower 10, that is, a gradient of a travel path. Gravitational accelerations in the lateral direction (x direction), the fore-and-aft direction (y direction), and the vertical direction (z direction) output by the sensor unit 27 are temporarily stored in the storage 20D. Gravitational acceleration data stored in the storage 20D is data from which noise is removed by applying predetermined filtering to the gravitational acceleration data output from the sensor unit 27.

Figure 5:
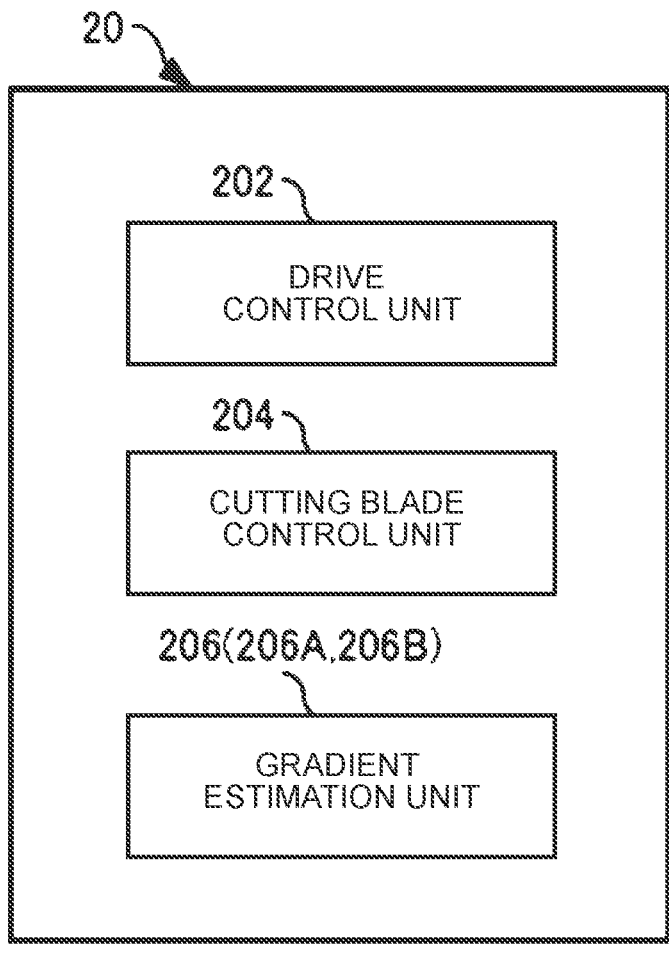
FIG. 5 is a block diagram showing the functional configuration of the mower according to the first embodiment of the present disclosure.

Next, the functional configuration of the control device 20 will be described with reference to FIG. 5. The control device 20 functions as an aggregate of a drive control unit 202, a cutting blade control unit 204, and a gradient estimation unit 206 by the CPU 20A reading an execution program stored in the ROM 20B and executing the program.

The drive control unit 202 inputs control signals to the motor controllers 16A to 16D based on a travel path and map data stored in the storage 20D, images captured by the camera units 24, and positional information of the mower 10 that is acquired by the GPS device 26. The drive control unit 202 controls the drive motors 22 via the motor controllers 16A to 16D to cause the mower 10 to travel along the travel path. When an object approaching the mower 10 is detected in the images captured by the camera units 24, the drive control unit 202 controls the drive motors 22 via the motor controllers 16A to 16D to temporarily stop the mower 10.

When the drive control unit 202 starts the travel of the mower 10, the cutting blade control unit 204 inputs, for example, preset numbers of revolutions, preset rotation speeds, and preset rotation directions of the cutting blade motors 32 to the motor controllers 16E and 16F, and controls the numbers of revolutions, the rotation speeds, and the rotation directions of the cutting blade motors 32 via the motor controllers 16E and 16F. When an object approaching the mower 10 is detected in the images captured by the camera units 24 or the cutting blade motors 32 are overloaded, the cutting blade control unit 204 controls the cutting blade motors 32 via the motor controllers 16E and 16F to temporarily stop the rotation of the cutting blades 36.

The gradient estimation unit 206 estimates a gradient of a slope on a predetermined travel path, that is, the travel path stored in the storage 20D based on the gravitational acceleration data output by the sensor unit 27, specifically, the gravitational acceleration data stored in the storage 20D.

Figure 6:
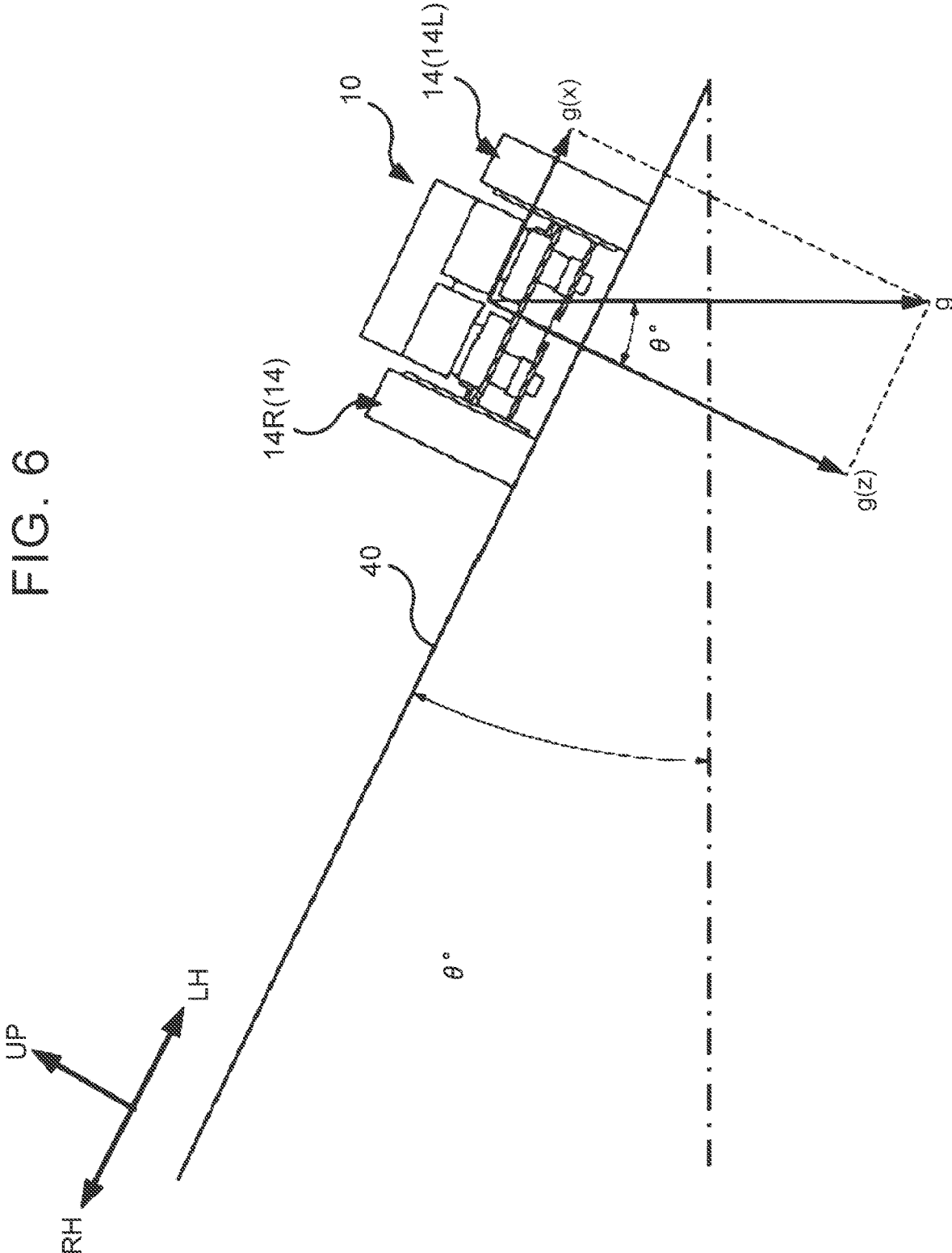
FIG. 6 is an explanatory diagram illustrating a gradient estimation method for the mower according to a modification of the first embodiment of the present disclosure.

When the traveling direction of the mower 10 is a direction crossing (substantially orthogonal to) an inclination direction of a slope 40 as shown in FIG. 6, the gradient estimation unit 206 estimates a gradient, that is, an inclination angle θ of the slope 40. In the present embodiment, the gradient estimation unit 206 estimates the gradient, for example, based on a component $g(x)$ of a gravitational acceleration $g$ in the lateral direction (x direction). Specifically, the value of $g(x)$ increases as the inclination angle θ increases. Therefore, derivation data showing a relationship between the component $g(x)$ of the gravitational acceleration $g$ in the lateral direction (x direction) and the inclination angle θ is acquired in advance and stored in the storage 20D. Then, the gradient estimation unit 206 derives the inclination angle θ based on the derivation data from the value of the component $g(x)$ of the gravitational acceleration $g$ in the lateral direction (x direction) that is acquired from the storage 20D.

Figure 7:
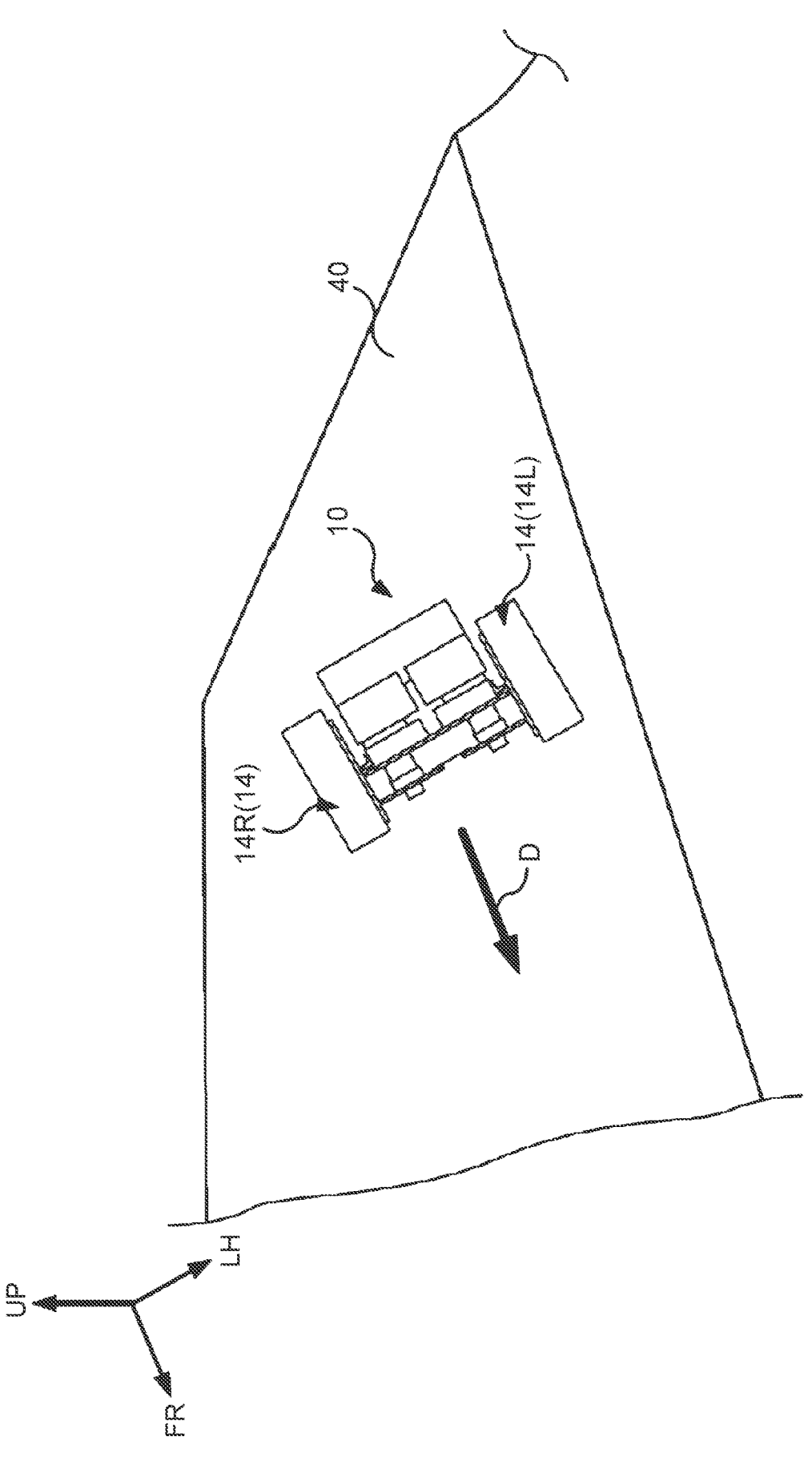
FIG. 7 is an explanatory diagram illustrating a travel of the mower on a slope according to the first embodiment of the present disclosure.

The drive control unit 202 drives the right crawler units 14R and the left crawler units 14L with different driving forces based on the gradient estimated by the gradient estimation unit 206, that is, the value of the inclination angle θ. When the mower 10 travels on the slope 40 along the travel path as shown in FIG. 7, the gravitational component $g(x)$ of the mower 10 in the lateral direction (x direction) is present as a force that pulls the mower 10 downward on the slope 40. This pulling force may increase depending on the gradient of the slope 40. Therefore, the mower 10 may slip down the slope 40 and become unable to travel in a predetermined traveling direction D. In the present embodiment, the right crawler units 14R and the left crawler units 14L are driven with different driving forces based on the gradient of the slope 40.

Specifically, in FIG. 7, the drive control unit 202 controls the drive motors 22 via the motor controllers 16A to 16D so that the driving force of the left crawler units 14L positioned on a lower side of the slope 40 is larger than the driving force of the right crawler units 14R positioned on an upper side of the slope 40. The drive control unit 202 performs control to increase a difference in the driving force between the right crawler units 14R and the left crawler units 14L as the gradient, that is, the inclination angle θ increases.

Figure 8:
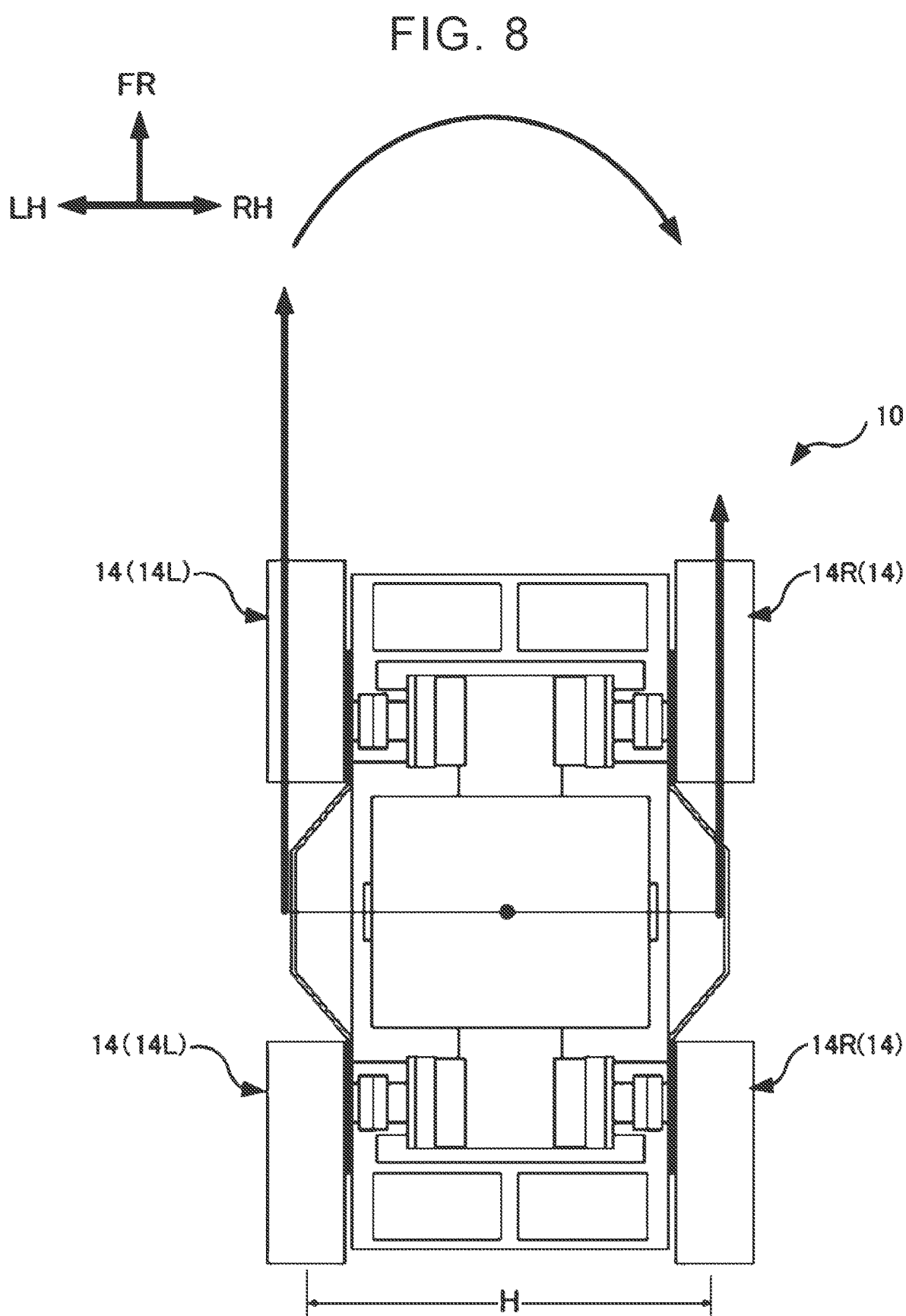
FIG. 8 is an explanatory diagram illustrating drive control for the mower on a slope according to the first embodiment of the present disclosure.

As shown in FIG. 8, the driving force of the left crawler units 14L positioned on the lower side of the slope 40 is larger than the driving force of the right crawler units 14R positioned on the upper side of the slope 40, thereby generating a moment for rotating the mower 10 clockwise. Therefore, the traveling direction of the mower 10 can be corrected. In the present embodiment, the drive control unit 202 performs control to drive the right crawler units 14R and the left crawler units 14L with different driving forces, for example, when the gradient, that is, the inclination angle θ of the slope 40 is larger than 25 degrees and equal to or smaller than 45 degrees.

The upper limit value and the lower limit value of the inclination angle θ are changeable by a user. For example, the lower limit value can be changed to 20 degrees or 30 degrees. For example, the upper limit value can be changed to 38 degrees, 50 degrees, or 58 degrees. The upper limit value and the lower limit value of the inclination angle θ may be changeable depending on, for example, a coefficient of friction of the surface of the crawler 14B of each crawler unit 14, that is, the degree of asperities.

Drive Control Method

Figure 9:
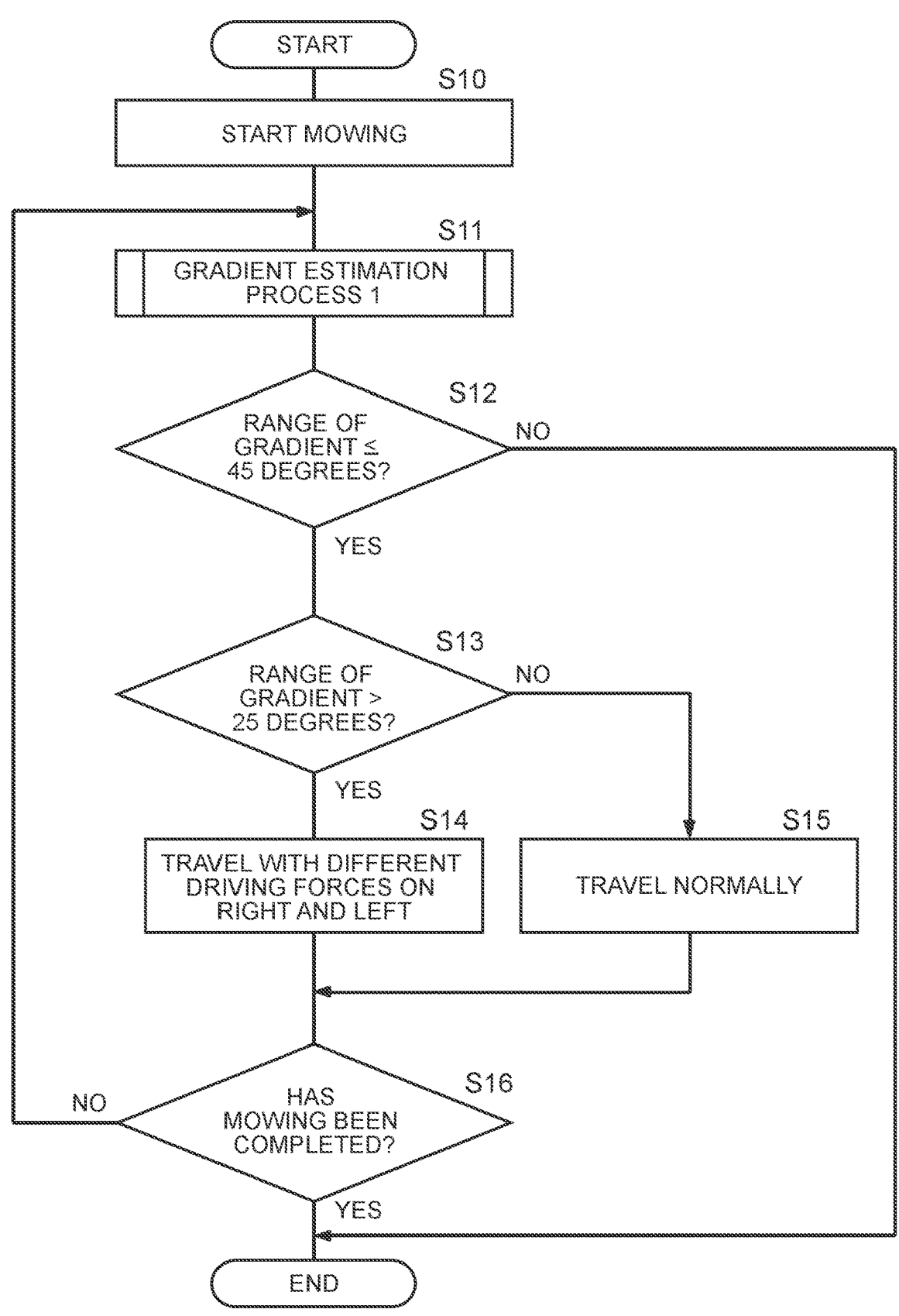
FIG. 9 is a flowchart showing a series of processes in the mower according to the first embodiment of the present disclosure.
Figure 10:
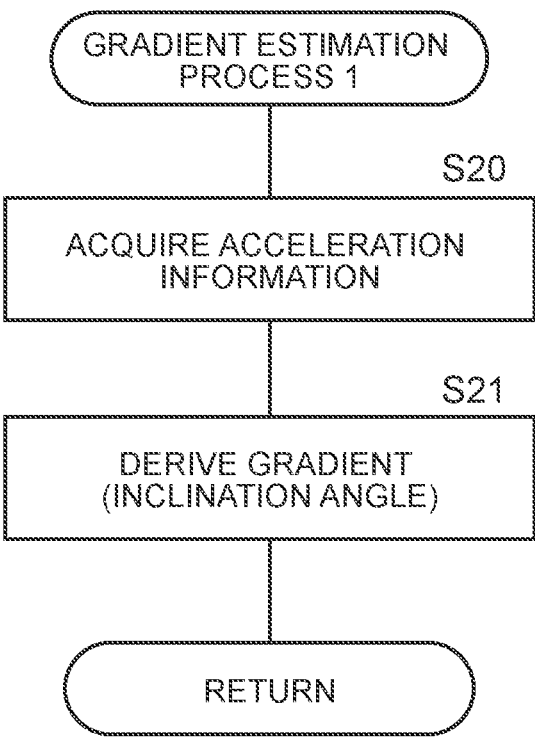
FIG. 10 is a flowchart showing a gradient estimation process for the mower according to the first embodiment of the present disclosure.

Hereinafter, a flow of a series of processes of a drive control method for the mower 10 will be described mainly with reference to flowcharts of FIGS. 9 and 10. In Step S10 of FIG. 9, the drive control unit 202 of the mower 10 according to the first embodiment first controls the drive of the drive motors 22 to start a travel of the mower 10, and the cutting blade control unit 204 controls the drive of the cutting blade motors 32 to start mowing by the mower 10.

In Step S11, the gradient estimation unit 206 estimates a gradient of the slope 40 on a travel path. In Step S20 of FIG. 10, the gradient estimation unit 206 acquires gravitational acceleration data, that is, acceleration information output from the sensor unit 27 and stored in the storage 20D.

In Step S21, the gradient estimation unit 206 derives a gradient, that is, an inclination angle θ of the slope 40 on the travel path based on the derivation data stored in the storage 20D from a value of the component $g(x)$ of the gravitational acceleration $g$ in the lateral direction (x direction) in the acceleration information acquired from the storage.

Referring back to FIG. 9, the drive control unit 202 determines in Step S12 whether the gradient (inclination angle) of a currently traveling area is equal to or smaller than 45 degrees. When the gradient is not equal to or smaller than 45 degrees, that is, the gradient is larger than 45 degrees (Step S12; NO), the drive control unit 202 determines that the mower 10 has difficulty in traveling, and stops the mower 10 to finish the mowing. When the gradient is equal to or smaller than 45 degrees in Step S12 (Step S12; YES), the drive control unit 202 determines in Step S13 whether the gradient (inclination angle) of the currently traveling area is larger than 25 degrees.

When the gradient is larger than 25 degrees (Step S13; YES), the drive control unit 202 drives the right crawler units 14R and the left crawler units 14L with different driving forces in Step S14 to cause the mower 10 to travel. That is, when the mower 10 travels in a straightforward direction (traveling direction) on a plane, the driving forces of the right crawler units 14R and the left crawler units 14L are substantially the same. When the mower 10 travels in a traveling direction crossing the inclination direction of the slope 40, the mower 10 travels by driving the right crawler units 14R and the left crawler units 14L with different driving forces.

Specifically, the drive control unit 202 controls the numbers of rotations or the rotation speeds of the drive motors 22 via the motor controllers 16A to 16D so that the driving force of the left crawler units 14L positioned on the lower side of the slope 40 having the gradient is larger than the driving force of the right crawler units 14R positioned on the upper side of the slope 40. The drive control unit 202 controls the drive motors 22 to increase the difference in the driving force between the right crawler units 14R and the left crawler units 14L as the gradient, that is, the inclination angle θ increases.

When the gradient is equal to or smaller than 25 degrees in Step S13 (Step S13; NO), the drive control unit 202 recognizes the travel path as a plane and causes the mower 10 to travel normally in Step S15. The term "normal travel" means not only that the mower 10 travels with the same driving force of the right crawler units 14R and the left crawler units 14L, but also that the mower 10 travels in the traveling direction along the travel path on a plane. That is, when the traveling direction is changed, the drive control unit 202 may cause the mower 10 to travel with different driving forces of the right crawler units 14R and the left crawler units 14L.

In Step S16, the drive control unit 202 determines whether the mowing has been completed. Specifically, the drive control unit 202 determines whether the mower 10 has finished traveling along the predetermined travel path. When the mowing has not been completed (Step S16; NO), the CPU 20A advances the process to Step S11 and performs the processes of Step S11 and subsequent steps. When the mowing has been completed (Step S16; YES), the drive control unit 202 stops the mower 10 to finish the mowing.

Operations and Effects of First Embodiment

Next, operations and effects of the first embodiment will be described.

The mower 10 of the first embodiment includes the four crawler units 14 (right crawler units 14R (right front and rear crawler units 14) and left crawler units 14L (left front and rear crawler units 14)) provided at the front and rear on the right and left sides and driven independently. The mower 10 further includes the gradient estimation unit 206 that estimates the gradient of the slope 40 on the preset travel path, and the drive control unit 202 that drives the right crawler units 14R and the left crawler units 14L with different driving forces based on the gradient estimated by the gradient estimation unit 206.

Therefore, the right crawler units 14R and the left crawler units 14L provided on the right and left sides can be driven independently. The gradient estimation unit 206 can estimate the gradient of the slope 40 on the travel path. The drive control unit 202 drives the drive units with different driving forces on the right and left sides based on the gradient estimated by the gradient estimation unit 206 to cause the mower 10 not to slip down the slope 40 when the mower 10 travels in a direction crossing the slope 40. Therefore, even if the travel path of the mower 10 has the gradient, the traveling direction of the mower 10 is corrected by driving the right crawler units 14R and the left crawler units 14L with different driving forces based on the gradient when the mower 10 travels in the direction crossing the slope. As a result, it is possible to prevent the mower 10 from slipping down the slope 40, thereby causing the mower 10 to travel in the traveling direction without deviating from the predetermined travel path.

When the mower 10 of the first embodiment travels in the direction crossing the slope 40, the drive control unit 202 sets the driving force of the crawler units 14 positioned on the lower side of the slope 40 to be larger than the driving force of the crawler units 14 positioned on the upper side of the slope 40. Therefore, a moment for rotating the body of the mower 10 toward the upper side of the slope 40 can be generated and thus the traveling direction of the mower 10 can be corrected.

In the mower 10 of the first embodiment, the drive control unit 202 drives the right crawler units 14R and the left crawler units 14L with different driving forces when the gradient estimated by the gradient estimation unit 206 is larger than 25 degrees. Therefore, the traveling direction of the mower 10 can effectively be corrected on the slope 40 having the gradient at which the mower 10 may slip down the slope.

In the mower 10 of the first embodiment, the right crawler units 14R and the left crawler units 14L individually include the drive motors 22. Therefore, the mower 10 can perform different drive control for the right crawler units 14R and the left crawler units 14L by the respective drive motors 22. Since the drive control unit 202 drives the drive motors 22 of the right crawler units 14R and the drive motors 22 of the left crawler units 14L by different control, the right crawler units 14R and the left crawler units 14L can be driven with different driving forces. By driving the drive motors 22 of the crawler units 14 by different control on the right and left sides, the right and left crawler units 14 can easily be driven with different driving forces.

The mower 10 of the first embodiment includes the sensor unit 27 including the triaxial acceleration sensor. Therefore, it is possible to acquire information on accelerations of the mower 10 in three directions. The gradient estimation unit 206 estimates the gradient of the slope 40 based on the acceleration information acquired by the sensor unit 27. Therefore, the gradient can be estimated from the acceleration information acquired by the sensor unit 27, that is, the lateral component of the gravitational acceleration applied to the body of the mower 10. As a result, the drive control unit 202 can drive the right and left crawler units 14 with different driving forces based on the gradient of the currently traveling slope 40. Thus, the mower 10 can travel along the travel path with higher accuracy.

The drive control method for the mower 10 of the first embodiment includes estimating the gradient of the slope 40 based on the acceleration information acquired by the sensor unit 27 on the travel path, and driving the right crawler units 14R and the left crawler units 14L with different driving forces based on the estimated gradient to cause the mower 10 not to slip down the slope 40 when the mower 10 travels in a direction crossing the slope 40. Therefore, even if the travel path of the mower 10 has the gradient, the traveling direction of the mower 10 is corrected by driving the right crawler units 14R and the left crawler units 14L with different driving forces based on the gradient when the mower 10 travels in the direction crossing the slope 40. As a result, it is possible to prevent the mower 10 from slipping down the slope 40. Thus, the mower 10 can travel in the traveling direction without deviating from the predetermined travel path.

Modification

In the mower 10 of the first embodiment, the gradient estimation unit 206 estimates the gradient of the slope 40 by using the acceleration information output by the sensor unit 27, but the present disclosure is not limited to this. In a mower 10A (see FIGS. 1 to 5) that is a modification of the mower 10 according to the first embodiment, a gradient estimation unit 206A estimates a gradient of a unit area. The "unit area" is changeable as appropriate depending on the size of the mower 10A, the accuracy of point cloud data described later, or the like.

A gradient estimation method by the gradient estimation unit 206A will be described. Hereinafter, a flow of a series of processes of a drive control method for the mower 10A will be described mainly with reference to flowcharts of FIGS. 11 and 12.

Figure 11:
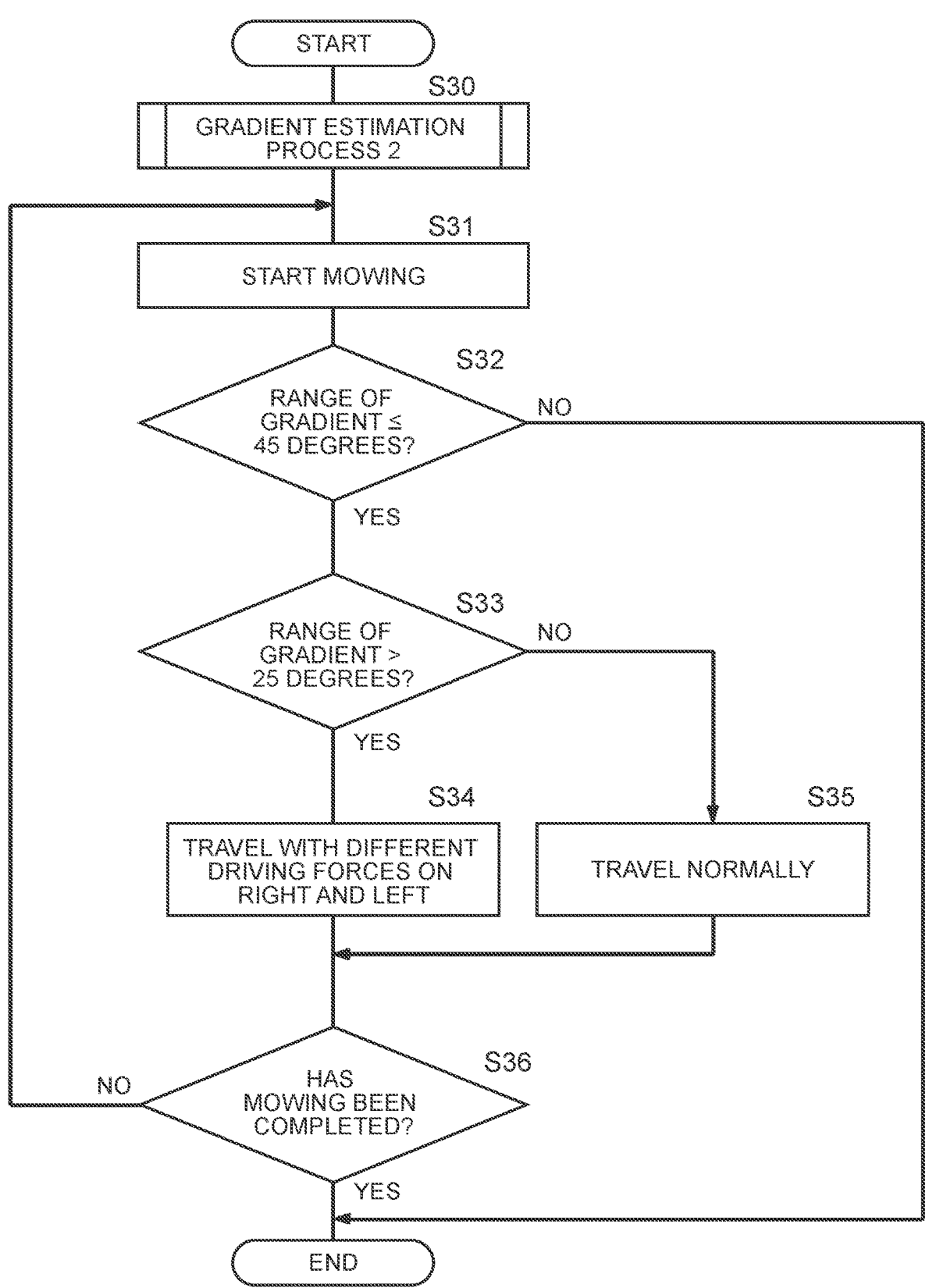
FIG. 11 is a flowchart showing a series of processes in the mower according to a modification of the first embodiment of the present disclosure.

As shown in FIG. 11, in the mower 10A that is the modification of the mower 10 according to the first embodiment, the gradient estimation unit 206A performs a gradient estimation process in Step S30 before the mowing is started in Step S31. That is, the gradient estimation unit 206A estimates the gradient of the unit area on the travel path in advance.

Figure 12:
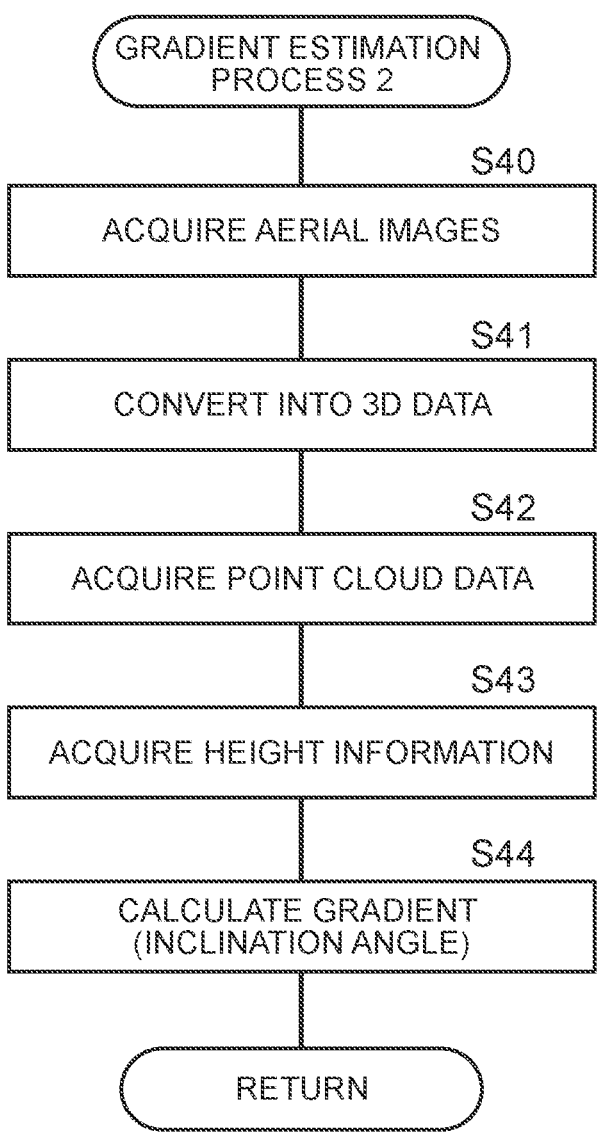
FIG. 12 is a flowchart showing a gradient estimation process for the mower according to the modification of the first embodiment of the present disclosure.

In Step S40 of FIG. 12, the gradient estimation unit 206A first acquires a plurality of aerial images showing an area including the predetermined travel path and captured from different positions by a drone (not shown). In Step S41, the gradient estimation unit 206A converts the acquired aerial images into three-dimensional data. Specifically, a conversion tool such as Metashape (registered trademark) is used.

In Step S42, the gradient estimation unit 206A acquires point cloud data of the area including the travel path from the three-dimensional data obtained by the conversion. Examples of the point cloud data include point cloud data of every area that is 50 mm in a longitudinal direction and a lateral direction (y direction, x direction). The point cloud data is three-dimensional data represented by orthogonal coordinates (x, y, z).

In Step S43, the gradient estimation unit 206A acquires height information of the predetermined travel path from the point cloud data. In the present modification, for example, the widths M of the "unit area" in the longitudinal direction and the lateral direction are set as follows. Among values of 50 mm×n (n is an integer), a value closest to a distance H (see FIG. 8) between the center of the crawler 14B of the right crawler unit 14R of the mower 10 in the lateral direction and the center of the crawler 14B of the left crawler unit 14L in the lateral direction is defined as a width M. The inclination direction of the slope 40 is assumed as the longitudinal direction of the unit area. Specifically, the gradient estimation unit 206A acquires z coordinates in the z direction for each width M in the point cloud data.

In Step S44, the gradient estimation unit 206A calculates the gradient, that is, the inclination angle θ of the unit area, that is, the area having the width M in the inclination direction and the width M in the direction orthogonal to the inclination direction. Specifically, the inclination angle θ is calculated based on Expression (1). The calculated inclination angle θ is stored in the storage 20D in association with the orthogonal coordinates (x, y, z).

$$\text{Inclination angle } \theta = \tan^{-1}((|z2-z1|)/M) \times 180/\pi \qquad (1)$$

In this expression, π is 3.14.

Referring back to FIG. 11, when the gradient estimation unit 206A estimates the gradient of the unit area on the travel path, in Step S31, the drive control unit 202 controls the drive of the drive motors 22 to start a travel of the mower 10A, and the cutting blade control unit 204 controls the drive of the cutting blade motors 32 to start mowing by the mower 10A. The processes of Steps S32 to S36 of FIG. 11 are the same as the processes of Steps S12 to S16 of FIG. 9, and therefore detailed description thereof will be omitted.

Operations and Effects of Modification of First Embodiment

Next, operations and effects of the modification of the first embodiment will be described.

In the mower 10A that is the modification of the mower 10 of the first embodiment, the gradient estimation unit 206A estimates the gradient of the slope 40 based on the height information of the travel path in the point cloud data acquired in advance for the preset travel path. Therefore, the gradient of the slope 40 on the travel path can be estimated in advance. As a result, the traveling direction of the mower 10A can be corrected before the body of the mower 10A slips down. Thus, it is possible to prevent the body of the mower 10A from slipping down the slope 40, thereby causing the mower 10A to travel in the traveling direction without deviating from the predetermined travel path.

The drive control method for the mower 10A of the first embodiment includes estimating the gradient of the slope 40 based on the height information of the travel path in the point cloud data in the captured images (aerial images) of the travel path acquired in advance. Therefore, the gradient of the slope 40 on the travel path can be estimated in advance. As a result, the traveling direction of the mower 10A can be corrected before the body of the mower 10A slips down. Thus, it is possible to prevent the body of the mower 10A from slipping down the slope 40, thereby causing the mower 10A to travel in the traveling direction without deviating from the predetermined travel path.

The gradient estimation unit 206A in the modification uses the conversion tool such as Metashape (registered trademark), but the present disclosure is not limited to this. For example, the height information may be acquired by a known method using trigonometry. The gradient estimation unit 206A acquires the aerial images captured by the drone, but the present disclosure is not limited to this. For example, the aerial images may be acquired by downloading from an external site. The gradient estimation unit 206A may acquire an orthorectified image having three-dimensional data in advance.

Second Embodiment

A mower 10B of a second embodiment (see FIGS. 1 to 5) includes a gradient estimation unit 206B different from the gradient estimation units of the mower 10 of the first embodiment and the mower 10A of the modification. When the gradient of the slope 40 on the travel path is estimated in advance as in the modification described above, geographic features may change due to, for example, landslide on the slope 40 caused by rain depending on the timing when the aerial images are captured. When the gradient of the currently traveling slope 40 is estimated as in the first embodiment described above, deviation may occur in the acceleration information acquired by the sensor unit 27 depending on the condition of the ground, such as bumps and dips on the slope 40.

In the mower 10B of the second embodiment, the gradient estimation unit 206B performs both the first estimation by the gradient estimation unit 206 of the first embodiment and the second estimation by the gradient estimation unit 206A of the modification. The gradient estimated by the first estimation and the gradient estimated by the second estimation are switched for use based on a predetermined condition.

In the second embodiment, for example, the mower 10B first uses the gradient estimated by the first estimation, and uses the gradient estimated by the second estimation when the predetermined condition is satisfied. For example, a roll angle R of the mower 10B, that is, an inclination of the mower 10B is acquired by a known method, and the above "condition" is satisfied when an angle difference between the roll angle R and the estimated inclination angle θ is equal to or larger than 20 degrees.

A gradient estimation method by the gradient estimation unit 206B will be described. Hereinafter, a flow of a series of processes of a drive control method for the mower 10B will be described mainly with reference to a flowchart of FIG. 13.

Figure 13:
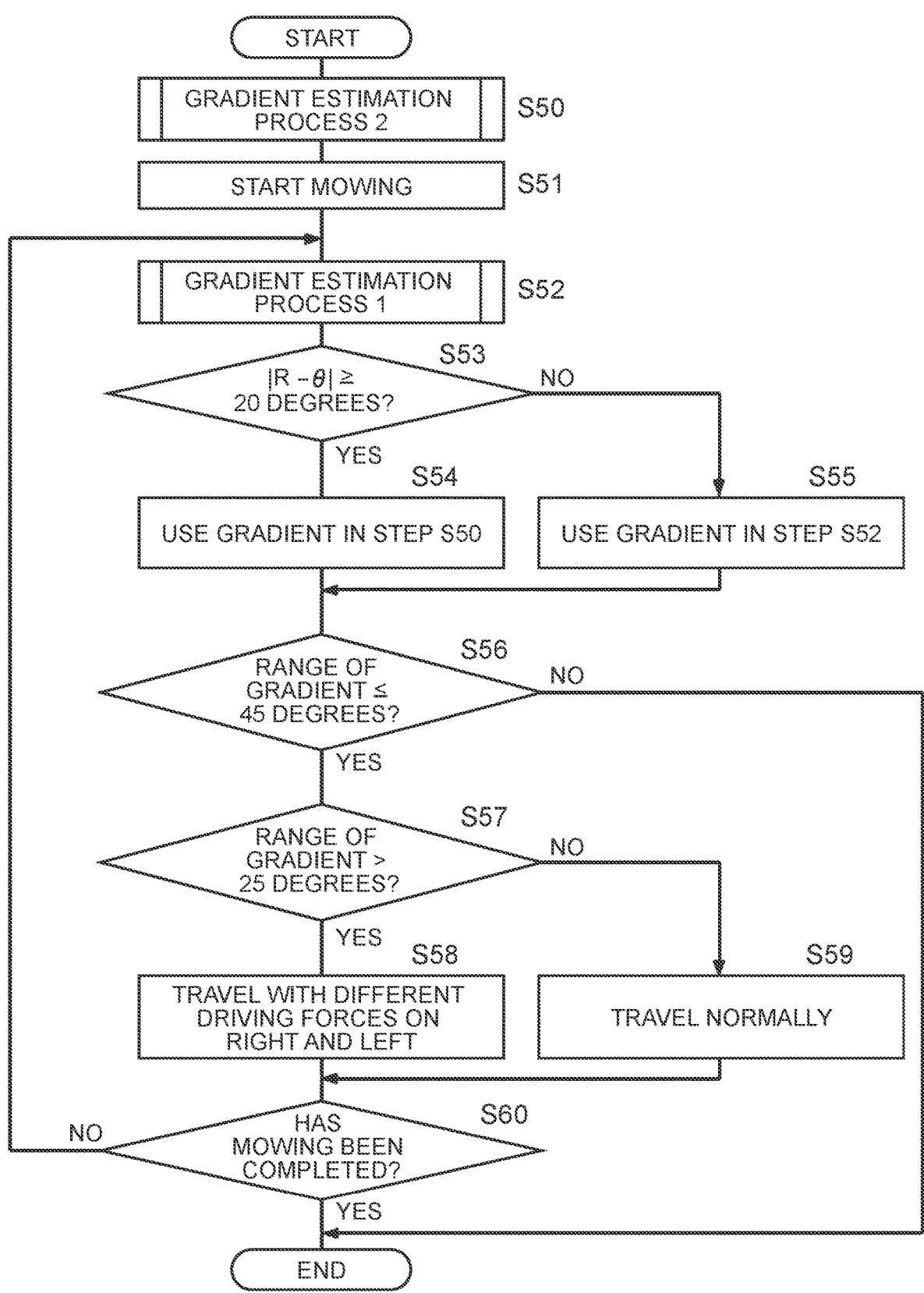
FIG. 13 is a flowchart showing a series of processes in the mower according to a modification of a second embodiment of the present disclosure.

As shown in FIG. 13, in the mower 10B according to the second embodiment, the gradient estimation unit 206B performs the second estimation, that is, the gradient estimation process 2 in Step S50 before the mowing is started in Step S51. That is, the gradient estimation unit 206B estimates the gradient of the unit area based on the height information of the travel path in the point cloud data acquired in advance for the travel path. The second gradient estimation process 2 in Step S50 is the same as the gradient estimation process 2 in Step S30 of FIG. 11, and therefore detailed description thereof will be omitted.

In Step S51, the drive control unit 202 controls the drive of the drive motors 22 to start a travel of the mower 10B, and the cutting blade control unit 204 controls the drive of the cutting blade motors 32 to start mowing by the mower 10B.

In Step S52, the gradient estimation unit 206B performs the first estimation, that is, the gradient estimation process 1. That is, the gradient estimation unit 206B estimates the gradient based on the gravitational acceleration data, that is, the acceleration information output from the sensor unit 27 and stored in the storage 20D. The gradient estimation process 1 in Step S52 is the same as the gradient estimation process 1 in Step S11 of FIG. 9, and therefore detailed description thereof will be omitted.

In Step S53, the gradient estimation unit 206B determines whether the angle difference between the roll angle R of the mower 10B and the inclination angle θ estimated in Step S52 is equal to or larger than 20 degrees. When the angle difference is equal to or larger than 20 degrees (Step S53; YES), the gradient estimation unit 206B determines that there is a possibility of deviation in the inclination angle θ estimated in Step S52. In Step S54, the gradient estimation unit 206B uses the gradient (inclination angle θ) estimated in Step S50 (second estimation).

When determination is made in Step S53 that the angle difference is smaller than 20 degrees (Step S53; NO), the gradient estimation unit 206B determines that there is no deviation in the inclination angle θ estimated in Step S52. In Step S55, the gradient estimation unit 206B uses the gradient (inclination angle θ) estimated in Step S52 (first estimation). The processes of Steps S56 to S60 are the same as the processes of Steps S12 to S16 of FIG. 9, and therefore detailed description thereof will be omitted.

Operations and Effects of Second Embodiment

Next, operations and effects of the second embodiment will be described.

The mower 10B of the second embodiment includes the sensor unit 27. Therefore, it is possible to acquire information on accelerations of the mower 10B in three directions. The gradient estimation unit 206B can perform the first estimation for estimating the gradient of the slope based on the acceleration information acquired by the sensor unit 27. Therefore, the gradient can be estimated from the acceleration information acquired by the sensor unit 27, that is, the lateral component of the gravitational acceleration applied to the body of the mower 10B. As a result, the drive control unit 202 can drive the right crawler units 14R and the left crawler units 14L with different driving forces based on the gradient of the currently traveling slope 40. Thus, the mower can travel along the travel path with higher accuracy.

In the mower 10B of the second embodiment, the gradient estimation unit 206B estimates the gradient of the slope 40 based on the height information of the preset travel path in the point cloud data acquired in advance for the travel path. Therefore, it is possible to perform the second estimation for estimating the gradient of the slope 40 on the travel path in advance. As a result, the traveling direction of the mower 10B can be corrected before the body of the mower 10B slips down. Thus, it is possible to prevent the body of the mower 10B from slipping down the slope, thereby causing the mower 10B to travel in the traveling direction without deviating from the predetermined travel path.

In the mower 10B of the second embodiment, the gradient estimation unit 206B performs the first estimation and the second estimation, and the drive control unit 202 switches the gradient estimated by the first estimation and the gradient estimated by the second estimation for use based on the predetermined condition. Therefore, for example, when deviation has occurred in the acceleration information acquired by the sensor unit 207 while the drive control unit 202 is performing drive control based on the gradient estimated by the first estimation, the drive control unit 202 can switch the drive control to drive control based on the gradient estimated by the second estimation. As a result, the mower 10B can travel in the traveling direction without deviating from the predetermined travel path.

Third Embodiment

Figure 14:
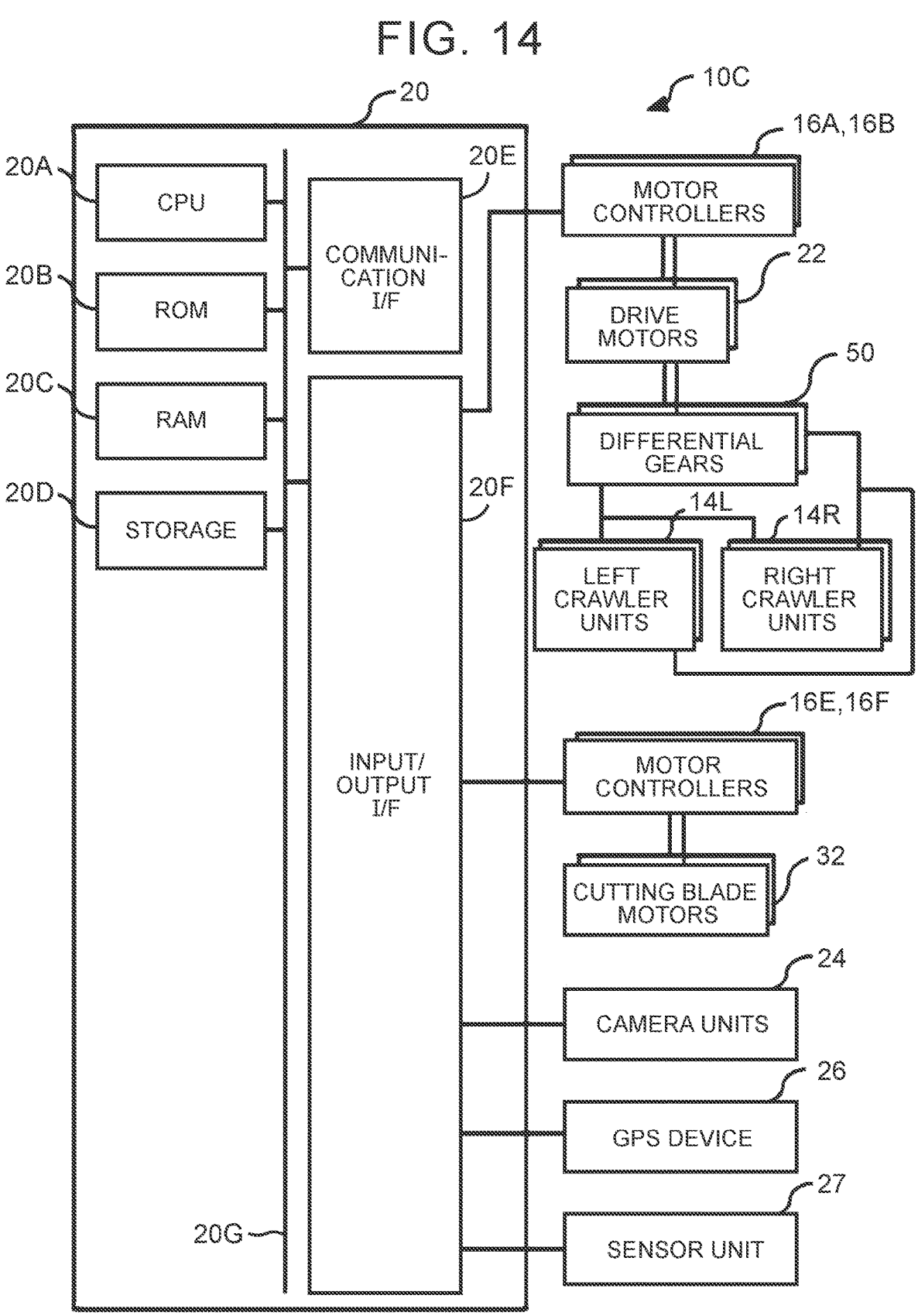
FIG. 14 is a block diagram showing the hardware configuration of a mower according to a third embodiment of the present disclosure.

While the mower 10 of the first embodiment and the mower 10A of the modification each include the four motor controllers 16 and the four drive motors 22, a mower 10C of a third embodiment includes two motor controllers 16 and two drive motors 22 as shown in FIG. 14. In addition, the mower 10C includes two differential gears 50.

One drive motor 22 and one differential gear 50 are provided for the right crawler unit 14R and the left crawler unit 14L at the front of the mower 10C, and one drive motor 22 and one differential gear 50 are provided for the right crawler unit 14R and the left crawler unit 14L at the rear of the mower 10C. The differential gear 50 is a device that transmits power to the rotator 14A of the right crawler unit 14R and the rotator 14A of the left crawler unit 14L while providing a difference in the number of rotations per unit time, and a known structure can be used.

Each of the front and rear differential gears 50 is connected to the shaft (not shown) of the rotator 14A of the right crawler unit 14R and the shaft (not shown) of the rotator 14A of the left crawler unit 14L that are provided to extend in the lateral direction. The motor shaft (not shown) of the drive motor 22 is directly or indirectly connected to the differential gear 50 to transmit power from the drive motor 22. Thus, in each of the front and rear differential gears 50, the output from one drive motor 22 can be distributed to the right crawler unit 14R and the left crawler unit 14L.

The drive control unit 202 of the mower 10C of the third embodiment drives the right crawler unit 14R and the left crawler unit 14L with different driving forces by causing the difference in the number of rotations per unit time between the rotator 14A of the right crawler unit 14R and the rotator 14A of the left crawler unit 14L that are rotated by the output transmitted from the differential gear 50.

Operations and Effects of Third Embodiment

Next, operations and effects of the third embodiment will be described.

The drive control unit 202 of the mower 10C of the third embodiment drives the right crawler unit 14R and the left crawler unit 14L with different driving forces at each of the front and rear by causing the difference in the number of rotations per unit time between the rotator 14A of the right crawler unit 14R and the rotator 14A of the left crawler unit 14L that are rotated by the output transmitted from the differential gear 50. By using the differential gear 50, the right crawler unit 14R and the left crawler unit 14L can be driven with different driving forces at each of the front and rear even in the case of one drive motor 22.

Fourth Embodiment

Figure 15:
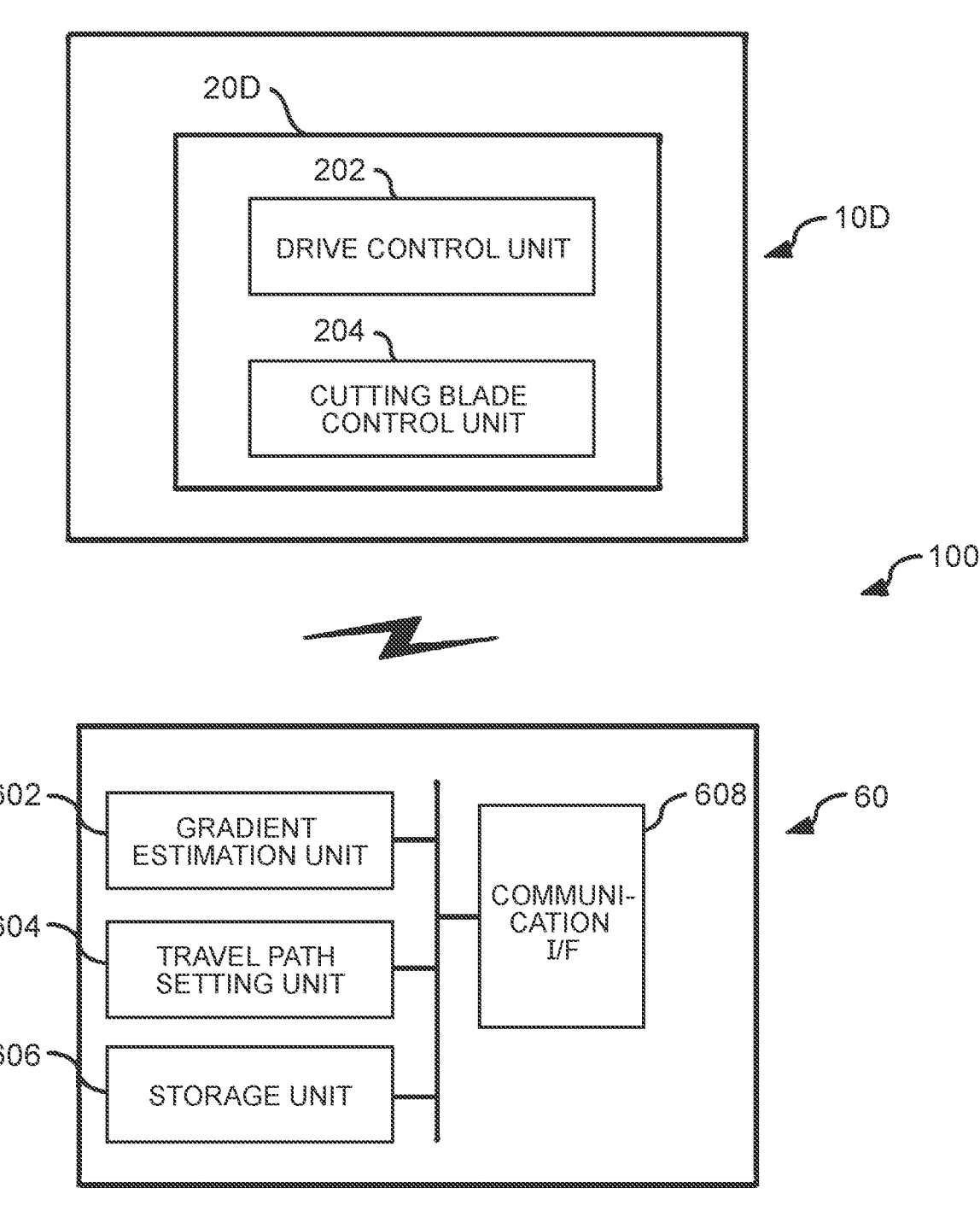
FIG. 15 is a block diagram showing the hardware configuration of a mowing system according to a fourth embodiment of the present disclosure.

Next, a mowing system 100 according to a fourth embodiment will be described. As shown in FIG. 15, the mowing system 100 includes a mower 10D and an external device 60. The mower 10D has a configuration in which the gradient estimation unit 206A is omitted from the mower 10A of the modification of the first embodiment. The same configuration as that of the mower 10A of the modification of the first embodiment can be used as the other configuration, and therefore detailed description thereof will be omitted. In the mower 10D, the communication I/F 20E corresponds to a second communication unit.

The external device 60 includes a gradient estimation unit 602, a travel path setting unit 604, a storage unit 606, a communication I/F 608, and the like.

The gradient estimation unit 602 has the same function as that of the gradient estimation unit 206A in the mower 10A of the modification of the first embodiment.

The travel path setting unit 604 sets a travel path along which the mower 10D travels, and stores the set travel path and map data of an area including the set travel path in the storage unit 606 in association with each other.

The storage unit 606 stores the travel path preset by the travel path setting unit 604. The storage unit 606 also stores a gradient of a unit area on the travel path estimated by the gradient estimation unit 602 in association with orthogonal coordinates (x, y, z). In the present embodiment, the storage unit 606 stores programs for performing various functions, various types of data, and the like.

The communication I/F 608 is an interface for communicating with the mower 10D, and standards such as Ethernet (registered trademark), LTE, FDDI, and Wi-Fi (registered trademark) are used. The communication I/F 608 corresponds to a first communication unit, and specifically, outputs information on the gradient estimated by the gradient estimation unit 602 to the mower 10D.

A drive control method for the mower 10D in the mowing system 100 of the present embodiment is substantially the same as the drive control method shown in FIG. 11. The only difference in the mower 10D in the mowing system 100 is that the gradient estimation unit 602 provided in the external device 60 performs the gradient estimation process 2 shown in FIG. 11. In the mowing system 100 of the present embodiment, the mower 10D refers to the gradient of the unit area stored in the storage unit 606 of the external device 60 via the communication I/F 608 when traveling while mowing grass.

Operations and Effects of Fourth Embodiment

Next, operations and effects of the fourth embodiment will be described.

In the mowing system 100 according to the fourth embodiment, the external device 60 includes the gradient estimation unit 602. Therefore, the external device 60 can estimate the gradient of the slope 40 on the travel path. The external device 60 further includes the communication I/F 608. Therefore, the information on the gradient estimated by the gradient estimation unit 602 can be output via the communication I/F 20E of the mower 10D.

In the mowing system 100 according to the fourth embodiment, the mower 10D includes the communication I/F 20E as the second communication unit and is provided separately from the external device 60 including the gradient estimation unit 602. Therefore, the mower 10D can receive, via the communication I/F 20E, the information on the gradient estimated by the gradient estimation unit 602 mounted on the external device 60. Therefore, the mower 10D need not have the function of the gradient estimation unit. In the mower 10D, the right crawler units 14R and the left crawler units 14L provided on the right and left sides can be driven independently.

In the mowing system 100 according to the fourth embodiment, the drive control unit 202 of the mower 10D drives the right crawler units 14R and the left crawler units 14L with different driving forces based on the gradient information received via the communication I/F 20E to cause the mower 10D not to slip down the slope 40 when the mower 10D travels in a direction crossing the slope 40. Therefore, even if the travel path of the mower 10D has the gradient, the traveling direction of the mower 10D is corrected by driving the right crawler units 14R and the left crawler units 14L with different driving forces based on the gradient when the mower 10D travels in the direction crossing the slope 40. As a result, it is possible to prevent the mower 10D from slipping down the slope 40, thereby causing the mower 10D to travel in the traveling direction without deviating from the predetermined travel path.

In the mowers 10 and 10B of the first embodiment and the second embodiment, the sensor unit 27 includes the triaxial acceleration sensor, but the present disclosure is not limited to this. The sensor unit 27 may include, for example, three acceleration sensors that each detect an acceleration along one of three different axes, or may use a gyro sensor if the inclination of the mower 10 can be detected. Thus, the sensor unit 27 may have any configuration.

In the mowers 10 and 10B of the first embodiment and the second embodiment, the derivation data showing the relationship between the component $g(x)$ of the gravitational acceleration $g$ in the lateral direction (x direction) and the inclination angle $\theta$ is acquired in advance, and the inclination angle $\theta$ is derived from the value of $g(x)$ output from the sensor unit 27 based on the derivation data. However, the method for estimating the inclination angle $\theta$, that is, the gradient is not limited to this. For example, the inclination angle $\theta$ may be derived based on a known expression, or may be changed as appropriate.

In the embodiments described above, the cutting blade control unit 204 starts controlling the drive of the cutting blade motors 32 when the drive control unit 202 starts the travel of the mower 10. However, the present disclosure is not limited to this. The cutting blade control unit 204 may start controlling the drive of the cutting blade motors 32 simultaneously with the travel of the mower 10 or before the mower 10 starts traveling.

In each crawler unit 14 of the embodiments described above, the rotator 14A is the substantially right-angled triangular pillar, but the present disclosure is not limited to this. For example, the rotator 14A may have an elliptical or circular shape, or may be changed as appropriate.

In the embodiments described above, the mower 10 is four-wheel drive, but the present disclosure is not limited to this. The mower 10 may be two-wheel drive.

In the embodiments described above, the crawler unit 14 is employed as the drive unit, but the present disclosure is not limited to this. The drive unit may be, for example, a wheel. The drive units of the mower of the present disclosure are not limited to the four drive units. The mower may have a structure in which one drive unit is provided on the right side and another drive unit is provided on the left side.

Various processors other than the CPU may execute each process that is executed when the CPU 20A shown in FIGS. 4 and 14 reads and executes the software (program) in the embodiments. Examples of the processors in this case include a programmable logic device (PLD) such as a field-programmable gate array (FPGA) for which a circuit configuration can be changed after production, and a dedicated electric circuit that is a processor having a circuit configuration designed exclusively for executing a specific process, such as an application specific integrated circuit (ASIC). Each process may be executed by one of these various processors or a combination of two or more processors of the same type or different types (for example, a combination of multiple FPGAs or a combination of a CPU and an FPGA). The hardware structure of each of the various processors is, more specifically, an electric circuit in which circuit elements such as semiconductor elements are combined.

Each program described in the embodiments may be provided by being recorded on a recording medium such as a compact disc read only memory (CD-ROM), a digital versatile disc read only memory (DVD-ROM), or a universal serial bus (USB) memory. Further, the program may be downloaded from an external device via a network.

The embodiments of the present disclosure have been described as above. However, the present disclosure is not limited to the above embodiments, and various modifications other than the above embodiments can be made without departing from the scope of the present disclosure.

The mower that mows grass on a slope as described above may slip down the slope depending on the gradient of the slope and become unable to travel in the traveling direction, thereby deviating from a predetermined travel path.

In view of the above facts, the present disclosure provides a mower that can travel in a traveling direction without deviating from a predetermined travel path, a mowing system, and a drive control method for the mower.

A mower according to a first aspect of the present disclosure includes driving devices respectively provided on a right side and a left side of the mower and configured to be driven independently; and one or more processors configured to: estimate a gradient of a slope on a travel path; and drive the driving devices with different driving forces on the right side and the left side based on the estimated gradient such that the mower does not slip down the slope when the mower travels in a direction crossing the slope.

In the mower according to the first aspect of the present disclosure, the driving devices (drive units) provided on the right and left sides can be driven independently. The one or more processors can estimate the gradient of the slope on the travel path.

In the mower according to the first aspect of the present disclosure, the one or more processors drive the drive units with the different driving forces on the right and left sides based on the estimated gradient to cause the mower not to slip down the slope when the mower travels in the direction crossing the slope. Therefore, even if the travel path of the mower has the gradient, the traveling direction of the mower is corrected by driving the right and left drive units with the different driving forces based on the gradient when the mower travels in the direction crossing the slope. As a result, it is possible to prevent the mower from slipping down the slope, thereby causing the mower to travel in the traveling direction without deviating from the predetermined travel path.

In the aspect described above, the one or more processors may be configured to, when the mower travels in the direction crossing the slop, set one of the driving forces of the driving devices positioned on a lower side of the slope to be larger than the other of the driving forces of the driving devices positioned on an upper side of the slope.

In the aspect described above, when the mower travels in the direction crossing the slope, the one or more processors set the driving force of the drive unit positioned on the lower side of the slope to be larger than the driving force of the drive unit positioned on the upper side of the slope. Therefore, a moment for rotating the body of the mower toward the upper side of the slope can be generated and thus the traveling direction of the mower can be corrected.

In the aspect described above, the one or more processors may be configured to drive the driving devices with the different driving forces on the right side and the left side when the estimated gradient is larger than a predetermined gradient.

In the aspect described above, the one or more processors drive the right and left drive units with the different driving forces when the estimated gradient is larger than the preset gradient. Therefore, the traveling direction of the mower can effectively be corrected on the slope having the gradient at which the mower may slip down the slope.

In the aspect described above, each of the driving device on the right side and the driving device on the left side may include a drive motor; and the one or more processors may be configured to drive the driving devices with the different driving forces on the right side and the left side by differently controlling the drive motor of the driving device on the right side and the drive motor of the driving device on the left side.

In the aspect described above, each of the drive unit on the right side and the drive unit on the left side includes the drive motor. Therefore, the drive of the drive unit on the right side and the drive of the drive unit on the left side can be controlled differently by the respective drive motors. In the mower according to the aspect described above, the one or more processors drive the drive motor of the drive unit on the right side and the drive motor of the drive unit on the left side by different control. Therefore, the right and left drive units can be driven with the different driving forces. By driving the drive motors of the drive units by different control on the right and left sides, the right and left drive units can easily be driven with the different driving forces.

In the aspect described above, a pair of the driving device on the right side and the driving device on the left side may include: a single drive motor; and a differential gear configured to distribute an output from the single drive motor to the driving device on the right side and the driving device on the left side; and the one or more processors may be configured to drive the driving devices with the different driving forces on the right side and the left side by causing a difference in the number of rotations per unit time between a rotator of the driving device on the right side and a rotator of the driving device on the left side that are rotated by the output transmitted from the differential gear.

In the aspect described above, the one or more processors cause the difference in the number of rotations per unit time between the rotator of the drive unit on the right side and the rotator of the drive unit on the left side that are rotated by the output transmitted from the differential gear. Therefore, the drive units can be driven with the different driving forces on the right and left sides. By using the differential gear, the drive units can be driven with the different driving forces on the right and left sides even in the case of the single drive motor.

In the aspect described above, the mower may include a triaxial acceleration sensor. The one or more processors may be configured to estimate the gradient based on acceleration information acquired by the triaxial acceleration sensor.

In the aspect described above, the triaxial acceleration sensor is provided, and therefore information on accelerations of the mower in three directions can be acquired. The one or more processors estimate the gradient of the slope based on the acceleration information acquired by the triaxial acceleration sensor. Therefore, the gradient can be estimated from the acceleration information acquired by the triaxial acceleration sensor, that is, a lateral component of a gravitational acceleration applied to the body of the mower. As a result, the one or more processors can drive the drive units with the different driving forces on the right and left sides based on the gradient of the currently traveling slope. Thus, the mower can travel along the travel path with higher accuracy.

In the aspect described above, the one or more processors may be configured to estimate a gradient of a unit area in a captured image including the travel path acquired in advance based on height information of the travel path that is based on point cloud data in the captured image.

In the aspect described above, the one or more processors estimate the gradient of the slope based on the height information of the travel path that is based on the point cloud data acquired in advance for the preset travel path. Therefore, the gradient of the slope on the travel path can be estimated in advance. As a result, the traveling direction of the mower can be corrected before the body of the mower slips down. Thus, it is possible to prevent the body of the mower from slipping down the slope, thereby causing the mower to travel in the traveling direction without deviating from the predetermined travel path.

In the aspect described above, the mower may include a triaxial acceleration sensor. The one or more processors may be configured to perform first estimation for estimating the gradient based on acceleration information acquired by the triaxial acceleration sensor, perform second estimation for estimating a gradient of a unit area in a captured image including the travel path acquired in advance based on height information of the travel path that is based on point cloud data in the captured image, and switch the gradient estimated by the first estimation and the gradient estimated by the second estimation for use based on a predetermined condition.

In the aspect described above, the triaxial acceleration sensor is provided, and therefore information on accelerations of the mower in three directions can be acquired. The one or more processors can perform the first estimation for estimating the gradient of the slope based on the acceleration information acquired by the triaxial acceleration sensor. Therefore, the gradient can be estimated from the acceleration information acquired by the triaxial acceleration sensor, that is, a lateral component of a gravitational acceleration applied to the body of the mower. As a result, the one or more processors can drive the right and left drive units with the different driving forces based on the gradient of the currently traveling slope. Thus, the mower can travel along the travel path with higher accuracy.

In the aspect described above, the one or more processors estimate the gradient of the slope based on the height information of the travel path that is based on the point cloud data acquired in advance for the preset travel path. Therefore, it is possible to perform the second estimation for estimating the gradient of the slope on the travel path in advance. As a result, the traveling direction of the mower can be corrected before the body of the mower slips down. Thus, it is possible to prevent the body of the mower from slipping down the slope, thereby causing the mower to travel in the traveling direction without deviating from the predetermined travel path.

In the aspect described above, the one or more processors perform the first estimation and the second estimation, and switch the gradient estimated by the first estimation and the gradient estimated by the second estimation for use based on the predetermined condition. Therefore, for example, when deviation has occurred in the acceleration information acquired by the triaxial acceleration sensor while the one or more processors are performing drive control based on the gradient estimated by the first estimation, the one or more processors can switch the drive control to drive control based on the gradient estimated by the second estimation. As a result, the mower can travel in the traveling direction without deviating from the predetermined travel path.

A mowing system according to a second aspect of the present disclosure includes an external device configured to estimate a gradient of a slope on a travel path, and output information on the estimated gradient, and a mower provided separately from the external device. The mower includes driving devices respectively provided on a right side and a left side of the mower and configured to be driven independently; and one or more processors configured to: receive the output information; and drive the driving devices with different driving forces on the right side and the left side based on the received information such that the mower does not slip down the slope when the mower travels in a direction crossing the slope.

In the mowing system according to the second aspect of the present disclosure, the external device can estimate the gradient of the slope on the travel path. The external device can also output the information on the estimated gradient.

In the mowing system according to the second aspect of the present disclosure, the mower is provided separately from the external device. Therefore, the mower can receive the information on the gradient estimated by the external device. Therefore, the mower need not have the function of estimating the gradient. The mower can independently drive the drive units provided on the right and left sides.

Particularly in the mower of the mowing system according to the second aspect of the present disclosure, the one or more processors drive the drive units with the different driving forces on the right and left sides based on the received gradient information to cause the mower not to slip down the slope when the mower travels in the direction crossing the slope. Therefore, even if the travel path of the mower has the gradient, the traveling direction of the mower is corrected by driving the drive units with the different driving forces on the right and left sides based on the gradient when the mower travels in the direction crossing the slope. As a result, it is possible to prevent the mower from slipping down the slope, thereby causing the mower to travel in the traveling direction without deviating from the predetermined travel path.

In a drive control method for a mower according to a third aspect of the present disclosure, the mower includes driving devices respectively provided on a right side and a left side of the mower and configured to be driven independently. The drive control method includes estimating a gradient of a slope on a travel path based on acceleration information obtained by a triaxial acceleration sensor on the travel path or height information of the travel path that is based on point cloud data in a captured image acquired in advance for the travel path; and driving the driving devices with different driving forces on the right side and the left side based on the estimated gradient such that the mower does not slip down the slope when the mower travels in a direction crossing the slope.

In the drive control method for the mower according to the third aspect of the present disclosure, the gradient of the slope on the travel path can be estimated based on the acceleration information output by the triaxial acceleration sensor on the travel path or the height information of the travel path that is based on the point cloud data in the captured image acquired in advance for the travel path.

In the drive control method for the mower according to the third aspect of the present disclosure, in the mower including the drive units provided on the right and left sides and to be driven independently, the drive units can be driven with the different driving forces on the right and left sides based on the estimated gradient to cause the mower not to slip down the slope when the mower travels in the direction crossing the slope.

In the drive control method for the mower according to the third aspect of the present disclosure, the drive units are driven with the different driving forces on the right and left sides based on the estimated gradient to cause the mower not to slip down the slope when the mower travels in the direction crossing the slope. Therefore, even if the travel path of the mower has the gradient, the traveling direction of the mower is corrected by driving the drive units with the different driving forces on the right and left sides based on the gradient when the mower travels in the direction crossing the slope. As a result, it is possible to prevent the mower from slipping down the slope, thereby causing the mower to travel in the traveling direction without deviating from the predetermined travel path.

As described above, the mower, the mowing system, and the drive control method for the mower according to the present disclosure attain an excellent effect that the mower can travel in the traveling direction without deviating from the predetermined travel path.

What is claimed is:

1. A mower comprising:
driving devices respectively provided on a right side and a left side of the mower and configured to be driven independently;
a triaxial acceleration sensor; and
one or more processors configured to:
estimate a gradient of a slope on a travel path;
drive the driving devices with different driving forces on the right side and the left side based on the estimated gradient such that the mower does not slip down the slope when the mower travels in a direction crossing the slope;
perform first estimation for estimating the gradient based on acceleration information acquired by the triaxial acceleration sensor;
perform second estimation for estimating a gradient of a unit area in a captured image including the travel path acquired in advance based on height information of the travel path that is based on point cloud data in the captured image; and
switch the gradient estimated by the first estimation and the gradient estimated by the second estimation for use based on a predetermined condition when an angle difference between a roll angle R and an estimated inclination angle $\theta$ is equal to or larger than a predetermined degree,
wherein the inclination angle $\theta = \tan-1((|z2-z1|)/M)\times180/\pi$.

2. The mower according to claim 1, wherein the one or more processors are configured to, when the mower travels in the direction crossing the slope, set one of the driving forces of the driving devices positioned on a lower side of the slope to be larger than the other of the driving forces of the driving devices positioned on an upper side of the slope.

3. The mower according to claim 1, wherein the one or more processors are configured to drive the driving devices with the different driving forces on the right side and the left side when the estimated gradient is larger than a predetermined gradient.

4. The mower according to claim 1, wherein:
each of the driving device on the right side and the driving device on the left side includes a drive motor; and
the one or more processors are configured to drive the driving devices with the different driving forces on the right side and the left side by differently controlling the drive motor of the driving device on the right side and the drive motor of the driving device on the left side.

5. The mower according to claim 1, wherein:
a pair of the driving device on the right side and the driving device on the left side includes:
a single drive motor; and
a differential gear configured to distribute an output from the single drive motor to the driving device on the right side and the driving device on the left side; and
the one or more processors are configured to drive the driving devices with the different driving forces on the right side and the left side by causing a difference in the number of rotations per unit time between a rotator of the driving device on the right side and a rotator of the driving device on the left side that are rotated by the output transmitted from the differential gear.

6. The mower according to claim 1, further comprising a triaxial acceleration sensor, wherein the one or more processors are configured to estimate the gradient based on acceleration information acquired by the triaxial acceleration sensor.

7. The mower according to claim 1, wherein the one or more processors are configured to estimate a gradient of a unit area in a captured image including the travel path acquired in advance based on height information of the travel path that is based on point cloud data in the captured image.

8. A mowing system comprising:

an external device configured to:

estimate a gradient of a slope on a travel path; and output information on the estimated gradient; and a mower provided separately from the external device, wherein the mower includes:

driving devices respectively provided on a right side and a left side of the mower and configured to be driven independently;

a triaxial acceleration sensor; and one or more processors configured to:

receive the output information; and drive the driving devices with different driving forces on the right side and the left side based on the received information such that the mower does not slip down the slope when the mower travels in a direction crossing the slope;

perform first estimation for estimating the gradient based on acceleration information acquired by the triaxial acceleration sensor;

perform second estimation for estimating a gradient of a unit area in a captured image including the travel path acquired in advance based on height information of the travel path that is based on point cloud data in the captured image; and switch the gradient estimated by the first estimation and the gradient estimated by the second estimation for use based on a predetermined condition when an angle difference between a roll angle R and an estimated inclination angle $\theta$ is equal to or larger than a predetermined degree, wherein the inclination angle $\theta = \tan^{-1}((|z2-z1|)/M) \times 180/\pi$.

9. A drive control method for a mower, the mower including driving devices respectively provided on a right side and a left side of the mower and configured to be driven independently, the drive control method comprising:

estimating a gradient of a slope on a travel path based on acceleration information obtained by a triaxial acceleration sensor on the travel path or height information of the travel path that is based on point cloud data in a captured image acquired in advance for the travel path;

driving the driving devices with different driving forces on the right side and the left side based on the estimated gradient such that the mower does not slip down the slope when the mower travels in a direction crossing the slope, performing first estimation for estimating the gradient based on acceleration information acquired by the triaxial acceleration sensor;

performing second estimation for estimating a gradient of a unit area in a captured image including the travel path acquired in advance based on height information of the travel path that is based on point cloud data in the captured image; and switching the gradient estimated by the first estimation and the gradient estimated by the second estimation for use based on a predetermined condition when an angle difference between a roll angle R and an estimated inclination angle $\theta$ is equal to or larger than a predetermined degree, wherein the inclination angle $\theta = \tan^{-1}((|z2-z1|)/M) \times 180/\pi$.

* * * * *